United States Patent
Kanamori et al.

(10) Patent No.: US 6,889,815 B2
(45) Date of Patent: May 10, 2005

(54) CONVEYING APPARATUS AND CONVEYING SYSTEM

(75) Inventors: Hiroshi Kanamori, Seto (JP); Shoji Yaguchi, Hiratsuka (JP); Yuichi Komazawa, Tokyo (JP)

(73) Assignees: Asahi-Seiki Manufacturing Co., Ltd., Owariasahi (JP); Lemcos, Inc., Tokyo (JP)

( * ) Notice: Subject to any disclaimer, the term of this patent is extended or adjusted under 35 U.S.C. 154(b) by 0 days.

(21) Appl. No.: 10/460,297

(22) Filed: Jun. 13, 2003

(65) Prior Publication Data

US 2003/0234155 A1 Dec. 25, 2003

(30) Foreign Application Priority Data

Jun. 20, 2002 (JP) .......................................... 2002-180202
Mar. 31, 2003 (JP) .......................................... 2003-094064

(51) Int. Cl.⁷ .......................... B65G 47/10; B65G 47/46; B65G 13/00
(52) U.S. Cl. .................... 198/369.4; 198/436; 198/445; 193/35 MD
(58) Field of Search .............................. 198/369.4, 394, 198/436, 444, 445; 193/35 MD

(56) References Cited

U.S. PATENT DOCUMENTS 3,174,613 A * 3/1965 Insolio ..................... 198/369.4
4,180,150 A * 12/1979 Moore ..................... 198/369.4
5,222,585 A * 6/1993 van der Werff ........... 198/369.4
5,921,374 A * 7/1999 Takino et al. ............. 198/369.4

FOREIGN PATENT DOCUMENTS

| EP | 1 167 245 A2 | 1/2002 |
| EP | 1 184 303 A1 | 3/2002 |
| JP | A 6-298321 | 10/1994 |
| JP | A 2001-192116 | 7/2001 |
| JP | B2 3228266 | 9/2001 |

* cited by examiner

Primary Examiner—Gene O. Crawford
(74) Attorney, Agent, or Firm—Oliff & Berridge, PLC

(57) ABSTRACT

There are disclosed a conveying apparatus and a conveying system in which a force is efficiently transmitted to an article so as to smoothly convey the article in an arbitrary direction. In each of feed portions 15 provided at a conveying apparatus 10, 11 of the invention, a twist gear 34 is mounted on a twist base 16, and is disposed below feed rollers 17, and therefore the degree of freedom of the configurations of the twist gear 34 and feed rollers 17 are higher as compared with a conventional construction in which a feed roller is provided within a twist gear. Therefore, a compact design of the twist gear 34 can be achieved, and also the feed portions 15 and 15 can be disposed closer to each other as compared with the conventional construction. And besides, a large-size design of the feed rollers 17 can be achieved, so that an area of contact of the feed rollers 17 with the article can be increased. As a result, the force can be efficiently transmitted to the article 90 from each of feed portions so as to smoothly convey the article in an arbitrary direction.

27 Claims, 20 Drawing Sheets

CONVEYING APPARATUS AND CONVEYING SYSTEM

BACKGROUND OF THE INVENTION

1. Field of the Invention

This invention relates to a conveying apparatus and a conveying system in which a plurality of feed portions are arranged two-dimensionally in a distributed manner over a conveying surface, and the feed portions sequentially feed an article so as to move the same to a predetermined position on the conveying surface.

2. Related Art

FIG. 22 shows a feed portion 1 provided in a conventional conveying apparatus of the type described. In this feed portion 1, a rotation shaft 3 is provided within a twist gear 2 rotatable about a vertical axis, and a feed roller 4 and an output bevel gear 5 are fixedly mounted on the rotation shaft 3. An input bevel gear 6 in mesh with a lower side of the output bevel gear 5 is driven by a servomotor so as to rotate the feed roller 4, while a spur gear 7 in mesh with the outer periphery of the twist gear 2 is driven by a servomotor so as to rotate the twist gear 2 (see Patent literature 1; JP-A-6-298321). With this construction, an article is conveyed in an arbitrary direction on a conveying surface of the conveying apparatus.

In the above conventional conveying apparatus, however, the roller 4 is provided within the twist gear 2, and therefore the shapes of the twist gear 2 and feed roller 4 are limited, so that the following problems have been encountered. Namely, it is difficult to form the twist gear 2 into a compact design since this twist gear receives the feed roller 4 therein, and the interval between the adjacent feed portions 1 and 1 becomes large. And besides, it is difficult to form the feed roller 4 into a large size since this feed roller 4 must be received within the twist gear 2, and the area of contact of the feed roller 4 with the article can not be increased, so that a force can not be efficiently transmitted from the feed roller 4 to the article. Because of these factors, it has actually been difficult for the conventional conveying apparatus to feed the article in an arbitrary direction on the conveying surface.

SUMMARY OF THE INVENTION

With the above problems in view, it is an object of this invention to provide a conveying apparatus and a conveying system in which a force is efficiently transmitted to an article so as to smoothly convey the article in an arbitrary direction.

According to the present invention, there is provided a conveying apparatus wherein a plurality of feed portions are arranged two-dimensionally in a distributed manner over a conveying surface for conveying articles, and the feed portions sequentially feed each article so as to move it to a predetermined position on the conveying surface; the apparatus comprising:

a fixed base holding the plurality of feed portions;

a twist base which is provided at each of the feed portions, and can be rotated about an axis substantially perpendicular to the conveying surface;

a feed roller which is mounted at an upper portion of each of the twist bases, and can be rotated about an axis substantially parallel to the conveying surface;

a twist-purpose servomotor for driving the twist bases;

a feed-purpose servomotor for driving the feed rollers;

a twist gear which is fixedly mounted on each of the twist bases, and is disposed below the feed roller, and is connected by gears to the twist-purpose servomotor; and a vertical shaft which extends through each of the twist gears at an axis thereof, an upper end of the vertical shaft being connected by gears to the feed roller while a lower end thereof is connected by gears to the feed-purpose servomotor.

Preferably, an idle shaft is mounted on the twist base, and is disposed below the feed roller in parallel relation thereto, and is connected to the feed roller by gears, and the idle shaft is connected to an upper end of the vertical shaft by bevel gears.

Preferably, upwardly-open mounting holes are formed in the fixed base, and each of the feed portions is formed into a unit which can be removably mounted in the mounting hole, and when the unit is inserted into the mounting hole from an upper side, the twist gear is connected to the twist-purpose servomotor by the gears, while the vertical shaft is kept connected by the gears to the feed-purpose servomotor by a weight of the feed portion.

Preferably, each of the twist gears is disposed at an upper side of a predetermined wall provided at the fixed base, while the lower end portion of each of the vertical shafts is disposed at a lower side of the wall.

Preferably, the twist gears of the adjacent feed portions are interconnected by an idle gear, and the twist-purpose servomotor serves as a common drive source for a predetermined number of the feed portions.

Preferably, the fixed base has a plurality of mounting portions provided around each of the feed portions, and the idle gears, each interconnecting the adjacent twist gears, are mounted at the mounting portions, respectively.

Preferably, the lower ends of the vertical shafts of the adjacent feed portions are interconnected by an idle gear, and the feed-purpose servomotor serves as a common drive source for a predetermined number of the feed portions.

Preferably, the fixed base has a plurality of mounting portions provided around each of the feed portions, and the idle gears, each interconnecting the lower ends of the adjacent vertical shafts, are mounted at the mounting portions, respectively.

Preferably, the plurality of the feed portions are arranged linearly, and a common drive shaft is provided beneath the feed portions, and extends in a direction of juxtaposition of the feed portions, and a vertical shaft extends through the twist base of each feed portion at the axis of rotation thereof, and a lower end of each of the vertical shafts is connected to the common drive shaft by bevel gears, while an upper end thereof is connected to a rotation shaft of the feed roller by bevel gears, so that the feed-purpose servomotor serves as a common drive source for the plurality of feed rollers.

Preferably, a plurality of the feed rollers of a cylindrical shape are provided at the upper portion of each of the twist bases in parallel relation to each other, and the plurality of feed rollers are interconnected by an idle roller.

Preferably, the plurality of feed portions are divided into a plurality of groups which are driven independently of each other.

Preferably, the plurality of feed portions are arranged in columns and rows in a distributed manner.

Preferably, the conveying surface has a square shape, and the plurality of feed portions are arranged in a distributed manner so that the number of columns of the feed portions is equal to the number of rows of the feed portions.

Preferably, there is provided a controller for the twist-purpose servomotor and the feed-purpose servomotor, and the controller computes the position of the article on the basis of information, relating to an initial position of the article entering the conveying surface, and feed condition information relating to the direction and rotating amount of the feed rollers.

Preferably, the controller determines a path of conveying of the article on the conveying surface on the basis of the information, relating to the initial position of the article, and information relating to a final position indicating a conveying destination of the article.

Preferably, the controller includes data storage means for storing layout data representative of conveying paths of the article on the conveying surface, and data change means for changing the layout data stored in the data storage means.

Preferably, the layout data includes entry position data, representing a position where the article enters the conveying surface, and exit position data representing a position where the article exits the conveying surface.

Preferably, the article can enter and exit the conveying surface at a plurality of positions, and the controller determines a conveying path in accordance with the entry and exit positions of the article.

Preferably, the controller includes article recognition means for recognizing the kind of the article, and conveying designation-determining means for determining different conveying destinations for different kinds of articles on the basis of recognition results of the article recognition means.

Preferably, the controller computes the position of the article by the use of a vector of a tangential velocity of the feed roller and the article relative to each other.

Preferably, a center of an area of contact between the feed roller and the article is disposed at the axis of rotation of the twist base.

Preferably, the controller includes signal transmitting/receiving means for transmitting and receiving information relative to the controllers of other conveying apparatuses so that when articles enter and exit between a conveying apparatus and another conveying apparatus, information in relation to the articles is transmitted and received between controllers of the respective conveying apparatuses.

Preferably, there are provided a plurality of article detection sensors each of which has a detection region, disposed in a direction perpendicular to the conveying surface, and detects the passage of the article, and the controller recognizes the position and/or size and/or posture of the article on the basis of detection results of the article detection sensors.

Preferably, the article detection sensors are embedded in the conveying surface.

Preferably, the controller causes the article to move while changing the posture thereof if necessary.

According to another aspect of the invention, there is provided a conveying system wherein a plurality of conveying apparatuses are interconnected so that the article can be moved between the conveying apparatuses.

Preferably, in the above conveying system, there is provided a main controller connected to the controllers provided respectively at the plurality of conveying apparatuses, and the main controller controls the plurality of conveying apparatuses in a coordinated manner.

DESCRIPTION OF THE PREFERRED EMBODIMENTS

[First Embodiment]

A first embodiment of the present invention is now described with reference to FIGS. 1 to 16.

Figure 1A:
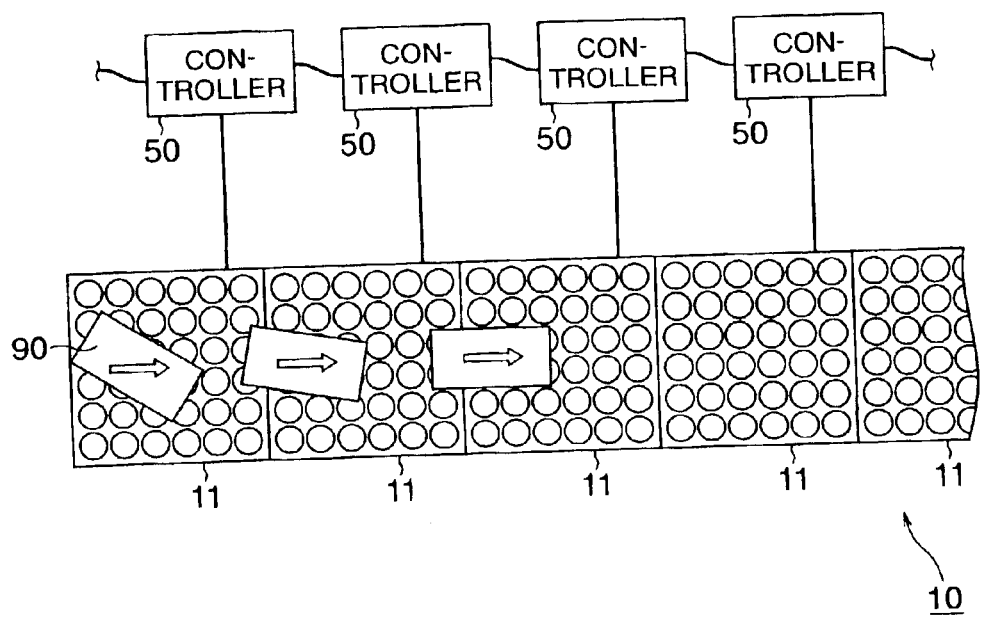
FIG. 1A is a plan view of a portion of one preferred embodiment of a conveying system of the present invention.

As shown in FIG. 1A (which is a plan view), a conveying system 10, embodying the present invention, comprises a plurality of conveying modules ("conveying apparatus" of the present invention) 11 arranged in a continuous manner, and can convey an article 90, placed on an upper surface, in a sliding manner. First, the structure of each conveying module 11 is described.

Figure 2:
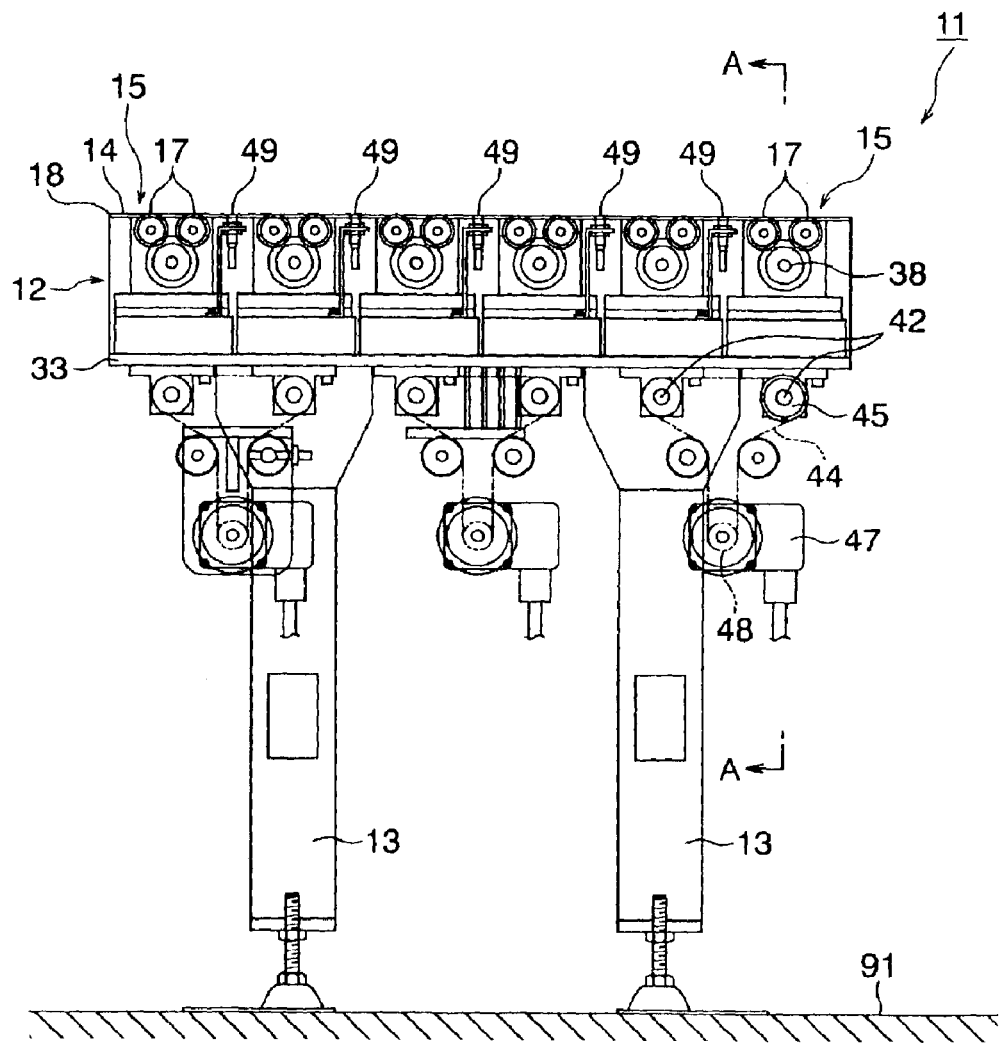
FIG. 2 is a side-elevational view of a conveying module constituting the conveying system.
Figure 3:
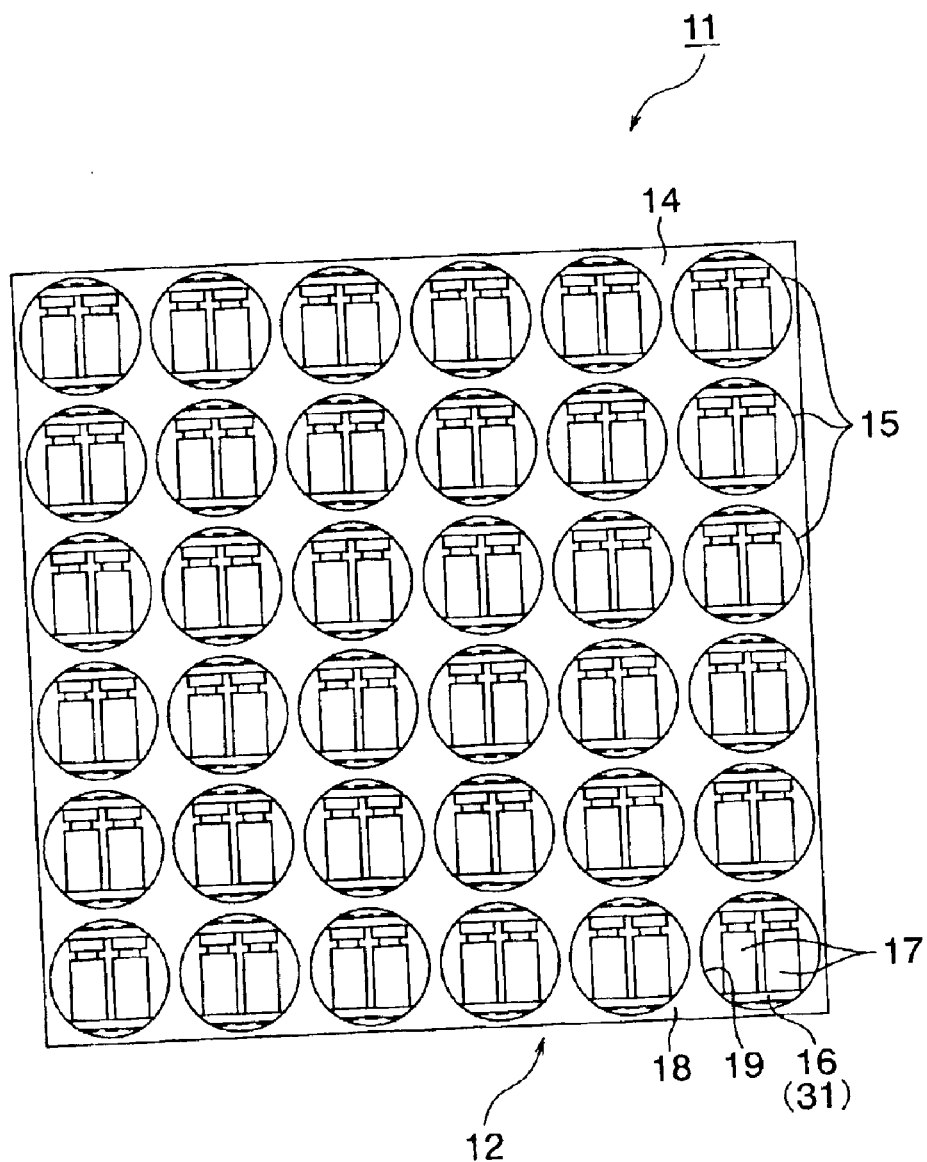
FIG. 3 is a plan view of a conveying module.

As shown in FIG. 2, the conveying module 11 includes a table-like fixed base 12. The fixed base 12 includes an upper wall 18 and a lower wall 33 vertically opposed to each other. A plurality of legs 13 extend downwardly from the lower wall 33, and these legs 13 are fixed, for example, to a floor 91 of a warehouse or the like. As shown in FIG. 3, the upper wall 18 has a generally plate-like form of a square shape, and 36 round holes 19 are formed through this upper wall 18, and are arranged in 6 columns and 6 rows (6×6=36) (Each column extends along two sides of the square while each row extends along the other two sides). The lower wall 33 has a generally plate-like form of a square shape corresponding to that of the upper wall 18. Feed portions 15 are mounted respectively on those portions of the lower wall 33 disposed in registry with the plurality of round holes 19, respectively. Upper ends of the feed portions 15 project respectively through the round holes 19 slightly beyond the upper surface of the fixed base 12. With this construction, the plurality of feed portions 15 are arranged two-dimensionally on a conveying surface 14 of the conveying module 11.

The term "conveying surface 14" should be construed as including not only the upper surface of the fixed base 12 but also the upper ends (more specifically, upper portions of feed rollers 17 described later) of the feed portions 15 projecting beyond the upper surface of the fixed base 12, and this conveying surface 14 serves as a surface for conveying an article. The fixed base 12 is not limited to the table-like shape, but can have, for example, a box-like shape.

Figure 4:
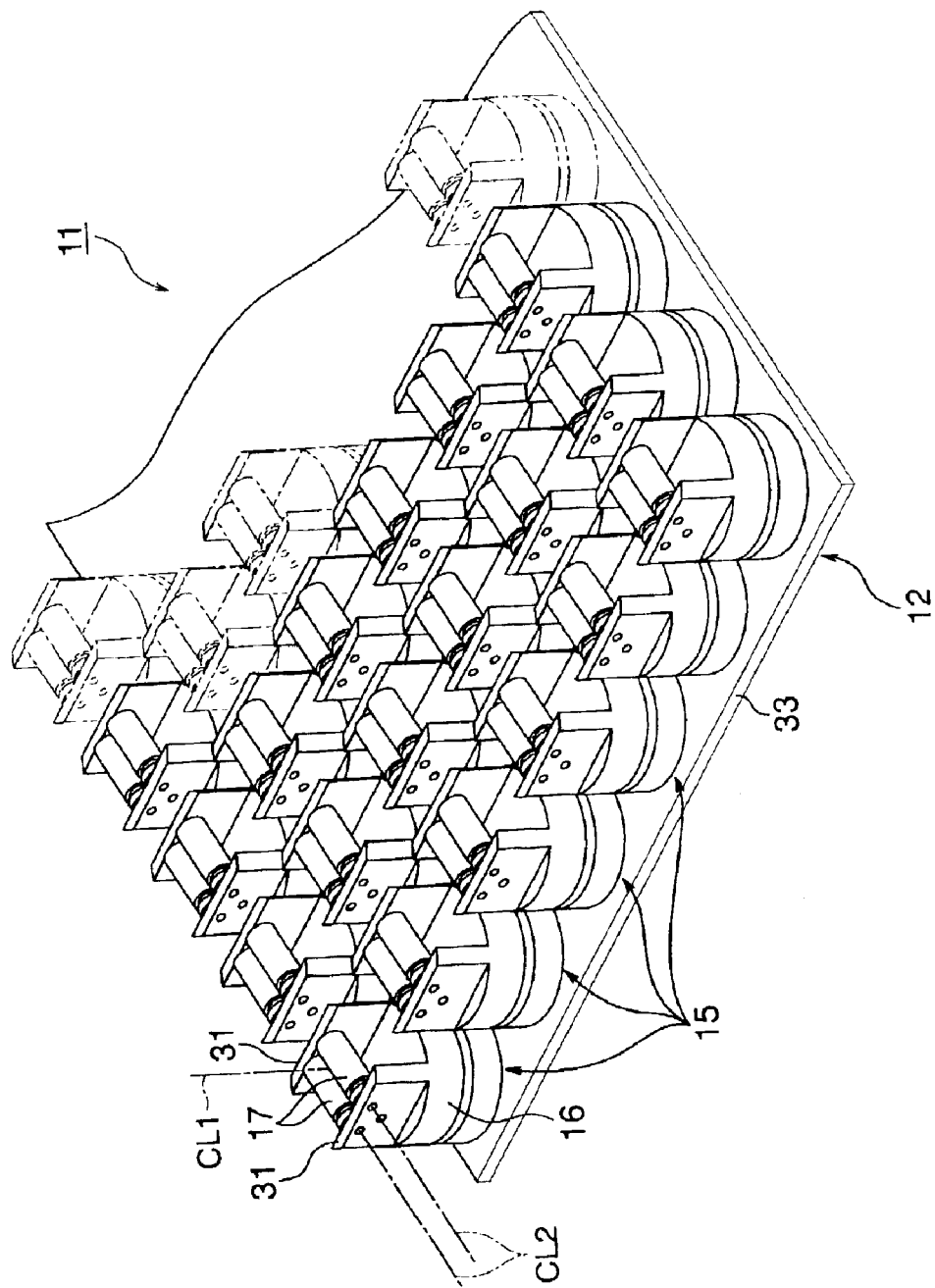
FIG. 4 is a perspective view of a portion of the conveying module, showing its internal structure.
Figure 5:
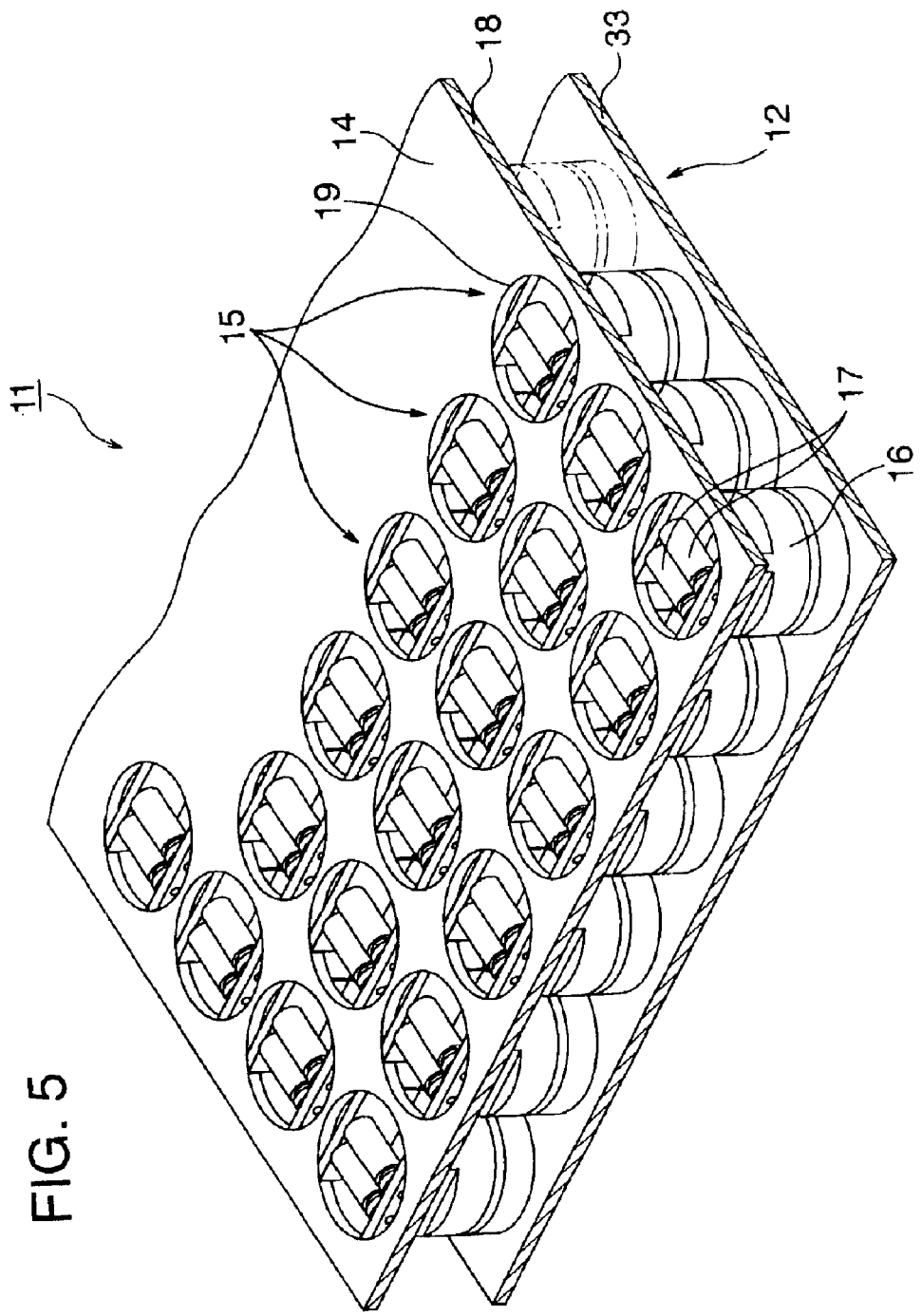
FIG. 5 is a perspective view of a portion of the conveying module, showing its external structure.

As shown in FIG. 4, the feed portion 15 includes the pair of feed rollers 17 and 17 provided at an upper portion of a twist base 16 rotatable about a vertical line CL1 perpendicular to the conveying surface 14 (not shown in FIG. 4). These feed rollers 17 are arranged in a juxtaposed manner in a plane parallel to the conveying surface 14, and these feed rollers 17, borne by the twist base 16, are rotated respectively about horizontal lines CL2 parallel to the conveying surface 14. As shown in FIG. 5, part of the two feed rollers 17 and 17 of the feed portion 15 project slightly upwardly from the round hole 19 so as to contact a lower surface of an article 90.

Figure 6:
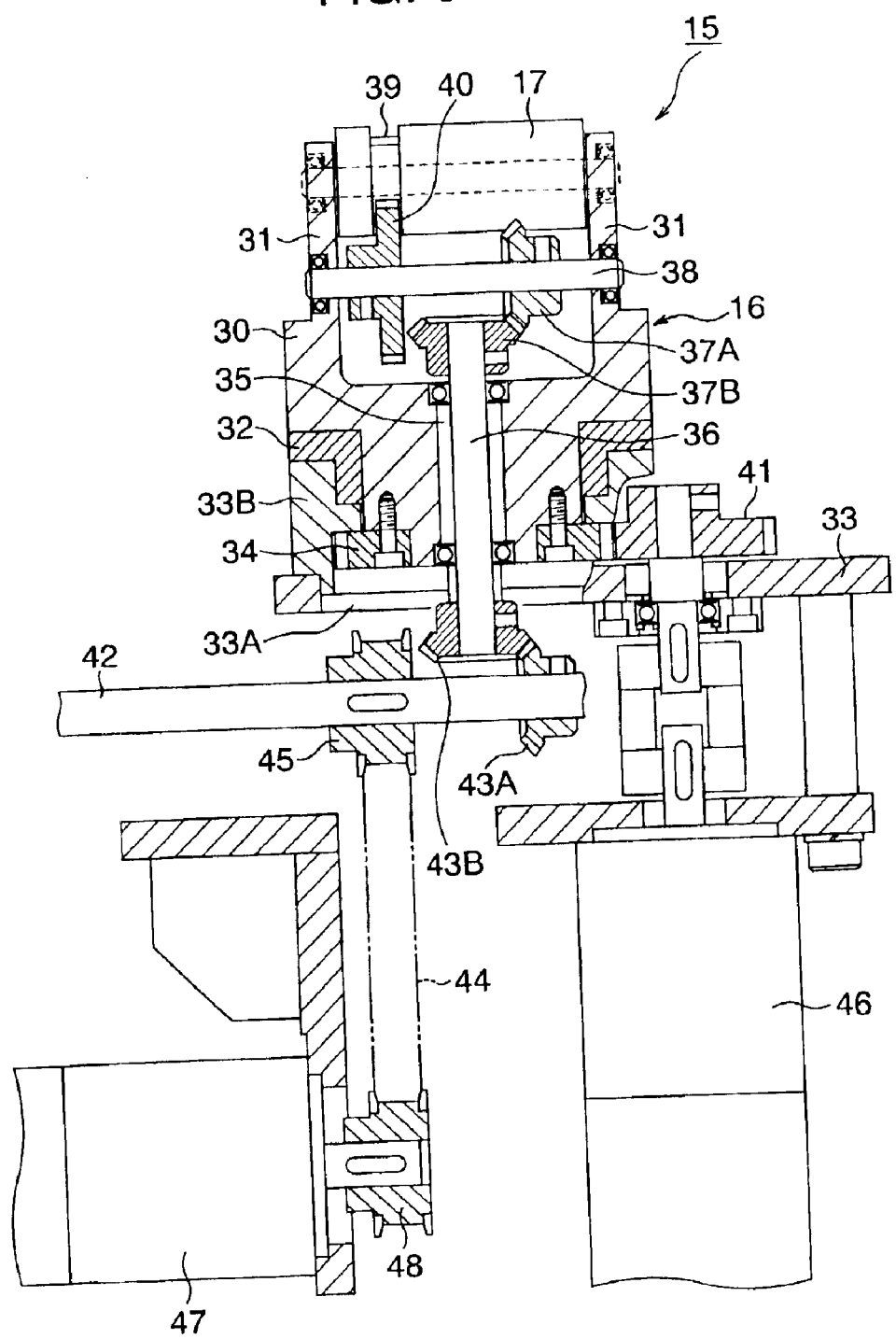
FIG. 6 is a cross-sectional view of a feed portion.

More specifically, mounting holes 33A are formed respectively through those portions of the lower wall 33 at which the feed portions 15 are mounted, respectively, as shown in FIG. 6, and a bearing tubular portion 33B extends upright from a peripheral edge of each mounting hole 33A. A bearing 32 (for example, a metal bearing) is provided on an inner peripheral surface and upper surface of the bearing tubular portion 33B.

The twist base 16 includes a pair of opposed walls 31 and 31 formed upright on an upper end of a twist shaft body 30. The twist shaft body 30 is stepped at its lower end portion into a smaller diameter, and this smaller-diameter portion of the twist shaft body 30 is inserted in the bearing tubular portion 33B, and is slidably borne by an inner peripheral surface of the bearing 32. A step surface of the twist shaft body 30, disposed intermediate the opposite axial ends thereof, is held in sliding contact with the upper surface of the bearing 32.

A twist gear 34 is fixedly secured to the lower end surface of the twist shaft body 30. This twist gear 34 is in the form of a spur gear, and is received in a lower end portion of the bearing tubular portion 33B, and is opposed to an inner step surface of the bearing tubular portion 33B, thereby retaining the twist base 16 against withdrawal from the bearing tubular portion 33B.

A through hole 35 is formed vertically through the twist shaft body 30 of the twist base 16 along a centerline (axis) thereof, and a vertical shaft 36 is rotatably borne by bearings fitted respectively in opposite end portions of the through hole 35, and an upper end portion of this vertical shaft 36 projects into a space formed between the opposed walls 31 and 31.

An idle shaft 38 extends between and are rotatably borne by lower end portions of the opposed walls 31 and 31 of the twist base 16. The idle shaft 38 perpendicularly intersects the axis of rotation of the twist base 16, and this idle shaft 38 is connected to the upper end of the vertical shaft 36 by a pair of bevel gears 37A and 37B.

The feed rollers 17 and 17 extend between and rotatably borne by the upper end portions of the opposed walls 31 and 31. These feed rollers 17 and 17 are disposed symmetrically with respect to a plane including the axis of rotation of the idle shaft 38 and the axis of rotation of the twist base 16. A constricted portion is formed at one end portion of each feed roller 17, and a spur gear 39 of a small diameter is mounted on this constricted portion. The spur gears 39 of the two feed rollers 17 are connected to an idle gear 40 fixedly mounted on the idle shaft 38. With this construction, when the vertical shaft 36 is powered to be rotated, the idle shaft 38 rotates through the connected bevel gears 37A and 37B, and when the idle shaft 38 thus rotates, the two feed rollers 17 and 17 rotate in the same direction through the connected spur gears 39 and 40.

Figure 7:
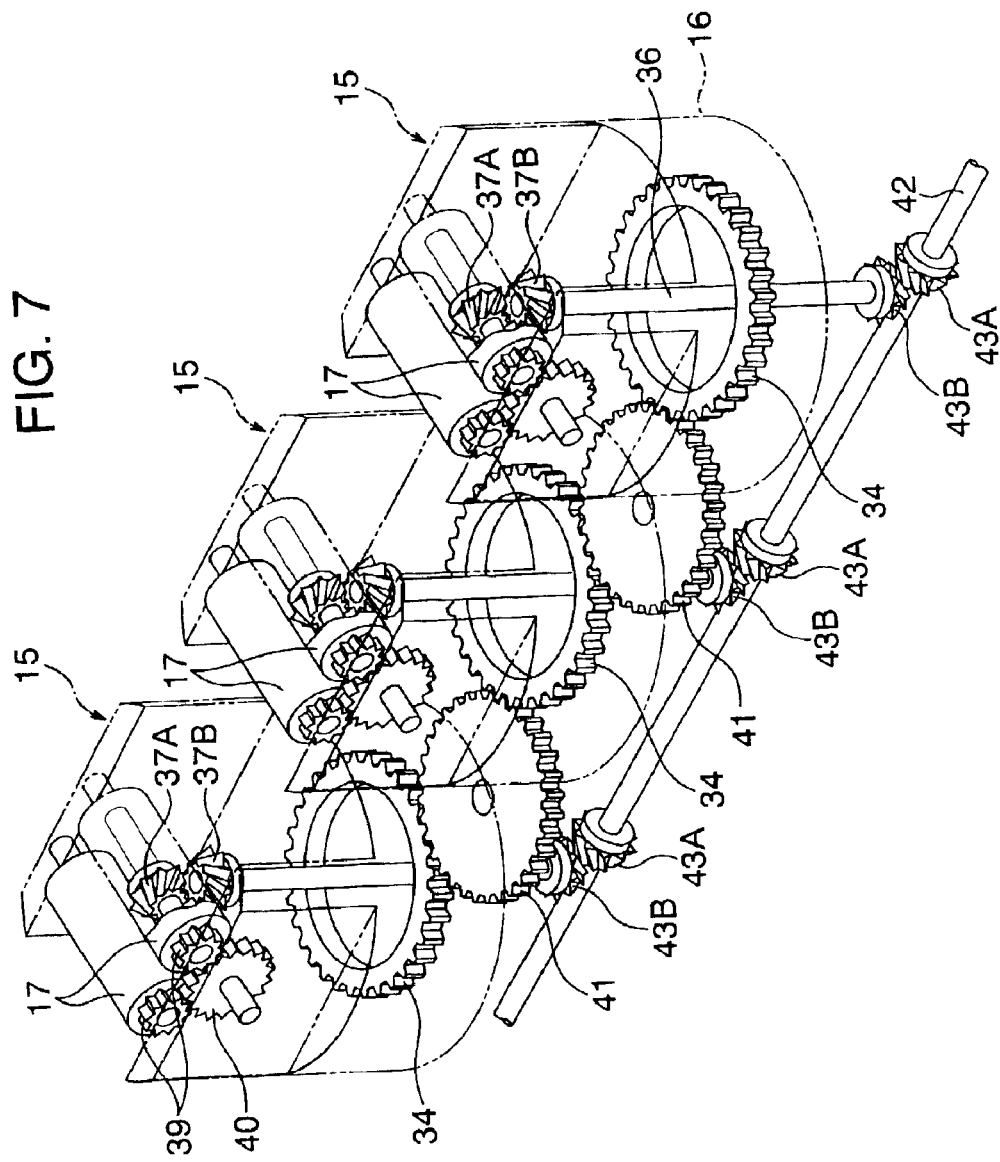
FIG. 7 is a perspective view of the feed portion.

In the conveying module 11 of this embodiment, a plurality of twist bases 16 can be mechanically interconnected into a group. More specifically, as shown in FIG. 7, the twist gears 34 and 34, each fixedly secured to the lower surface of the corresponding twist base 16, are connected together by idle gears 41, thereby forming the group in which these twist bases 16 make the same rotational motion in an interlocked manner. For canceling the grouping, the idle gears 41 are removed.

Similarly, a plurality of feed portions 15 can be formed into a group by mechanically interconnecting their feed rollers 17. More specifically, as shown in FIG. 7, a common drive shaft 42 is provided beneath the feed portions 15, and extends to perpendicularly intersect the axis of rotation of each of the twist bases 16, and is rotatably supported. Bevel gears 43A, fixedly mounted on the intermediate portion of the common drive shaft 42, are connected respectively to bevel gears 43B fixedly mounted respectively on lower end portions of the vertical shafts 36 of the feed portions 15. With this construction, there is formed the group in which the feed rollers 17 of the feed portions 15 make the same rotational motion in an interlocked manner. Also, when the common drive shafts 42 and 42 of the adjacent rows are connected together by a timing belt 44 and pulleys 45 as shown in FIG. 2, the number of the feed rollers 17 for making the same rotational motion can be increased. The grouping can be canceled by removing the bevel gears 43A and 43B or by providing the timing belts 44 separately.

As shown in FIG. 6, the twist base 16 of the feed portion 15 is driven by a twist-purpose servomotor 46. The feed rollers 17 are driven by a feed-purpose servomotor 47. One twist-purpose servomotor 46 is provided for each group of feed portions 15, and a drive shaft of the twist-purpose servomotor 46 is connected to each of the idle gears 41 interconnecting the twist bases 16 of the same group. With this construction, the plurality of twist bases 16 of the same group are driven by one twist-purpose servomotor 46 serving as a common drive source, and therefore the cost is reduced as compared with the case where such grouping is not achieved.

One feed-purpose servomotor 47 is provided for each group of feed portions 15. As shown in FIG. 2, a pulley 48 is fixedly mounted on a drive shaft of the feed-purpose servomotor 47, and this pulley 48 is engaged with part of the timing belt 44 interconnecting the common drive shafts 42 and 42. With this construction, the plurality of feed rollers 17 of the same group are driven by one feed-purpose servomotor 47 serving as a common drive source, and therefore the cost is reduced as compared with the case where such grouping is not achieved.

Incidentally, one twist-purpose servomotor 46 can be provided for the twist base 16 of each feed portion 15, and one feed-purpose servomotor 47 can be provided for the feed rollers 17 of each feed portion 15. With this construction, the degree of freedom with respect to the direction of conveying of the article 90 increases, and increased variations of conveying paths can be obtained.

Figure 8:
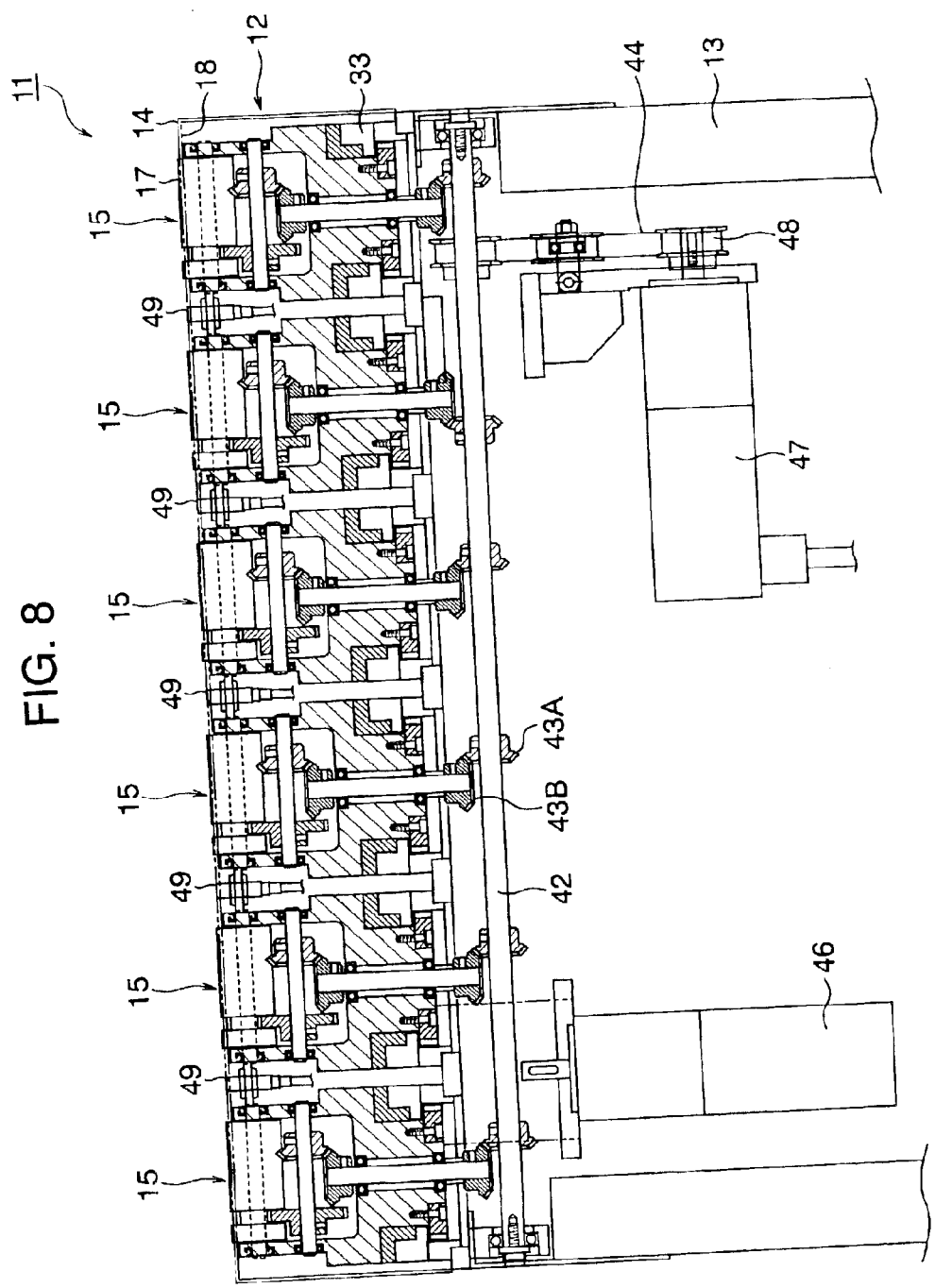
FIG. 8 is a cross-sectional view taken along the line A—A of FIG. 2.

As shown in FIG. 8, a plurality of article detection sensors 49 are embedded in the upper wall 18 of the fixed base 12. For example, when imaginary latticed lines are depicted on the conveying surface 14 in such a manner that each feed portion 15 is surrounded by corresponding portions of these lines, the article detection sensors 49 are located respectively at intersections of these lines. Each of these article detection sensors has a detection region disposed in a direction perpendicular to the conveying surface 14, and detects the passage of the article 90 (for example, this sensor is turned on (or activated) upon passage of the article). Each article detection sensor 49 can comprise a proximity switch, a laser sensor or the like.

Figure 9:
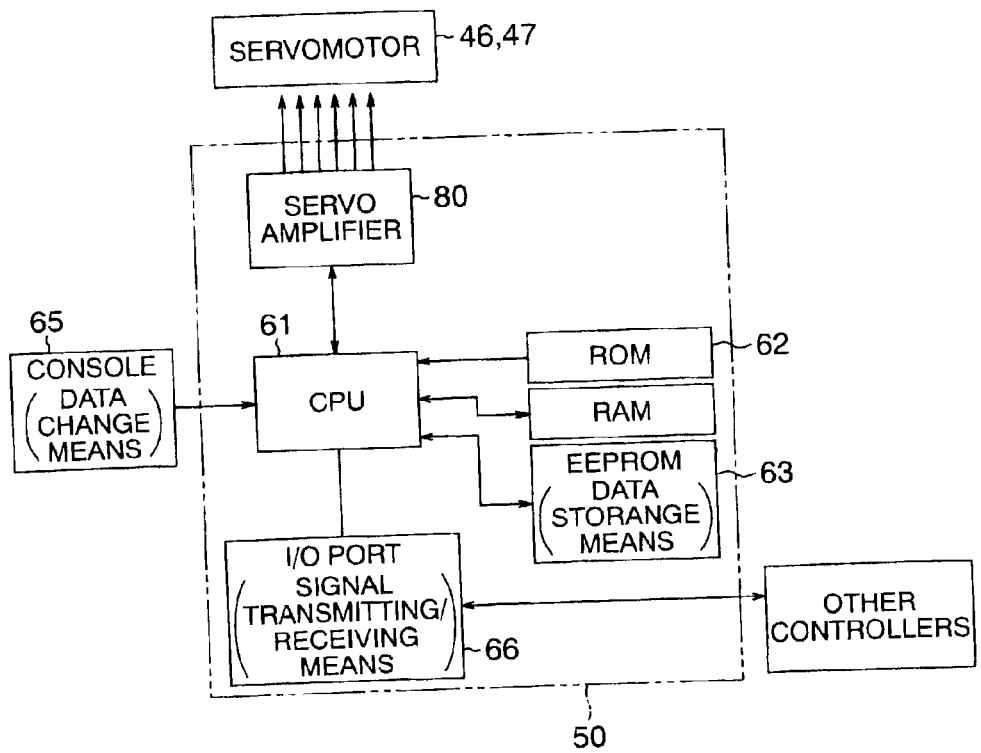
FIG. 9 is a block diagram showing an electrical construction of a controller.

A controller 50 includes, for example, a CPU 61 as shown in FIG. 9, and this CPU 61 executes a main program, stored in a ROM 62, at predetermined periods, and feeds a drive command to a servo amplifier 80 for the servomotors 46 and 47 to drive the feed portions 15 so as to convey the article 90 along a predetermined conveying path. Details are described in the following.

The CPU 61 computes the position of the article 90 on the basis of the initial position of the article 90 and a vector of a tangential velocity of the article 90 and the feed rollers 17 relative to each other. Here, the vector of the tangential velocity is also a vector of a travel speed of the article 90, and starts from the axis of rotation of the twist base 16 of each feed portion 15, and is directed in the direction of juxtaposition of the two feed rollers 17 and 17, and has a scalar proportional to the rotational speed of the feed rollers 17. Therefore, the vector of the tangential velocity is specified by the direction and rotational speed of the feed rollers 17.

Figure 10:
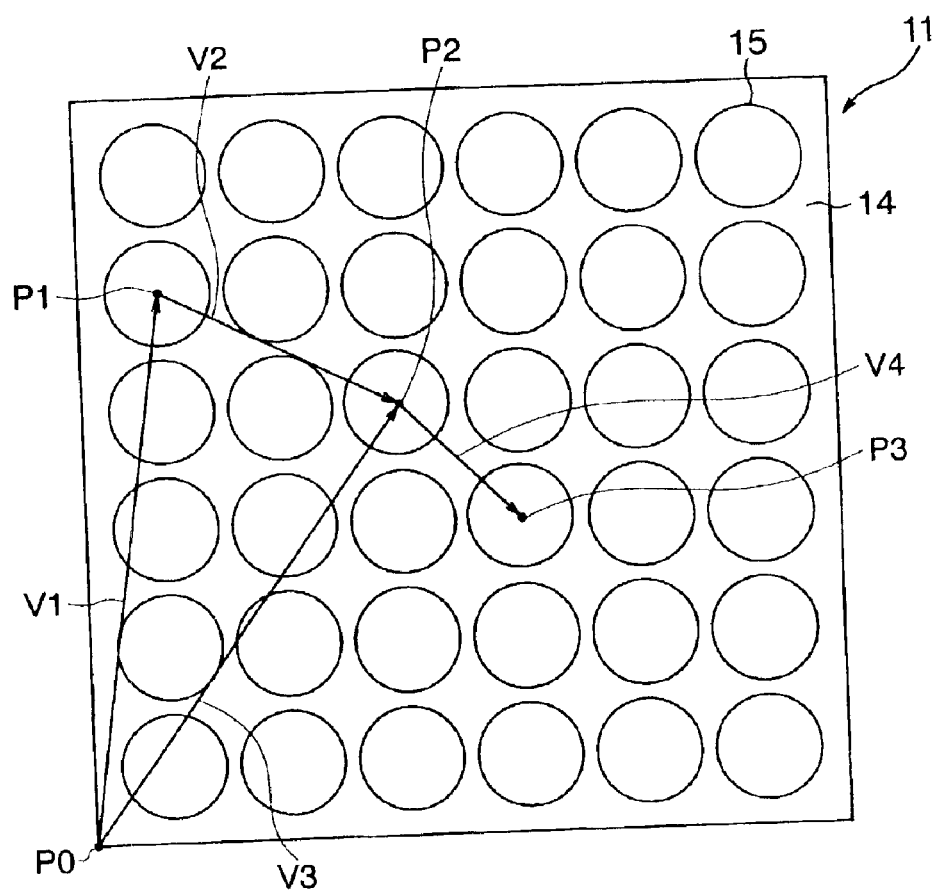
FIG. 10 is a conceptual view of a vector control.

For example, as shown in FIG. 10, a vector V1, interconnecting the origin P0 (set in a predetermined position on the conveying surface 14) and an initial position P1 of the article 90, is found, and the sum of a vector V2 of a travel speed of the article 90 at the initial position P1 (i.e., a vector of the tangential velocity of the article relative to the feed rollers 17) and the vector V1 is found. Therefore, a vector V3, interconnecting the origin P0 and an arrival position P2, is found as the sum of the vectors V1 and V2. Therefore, coordinates of the arrival position P2 of the article 90 (at which the article 90 is located upon lapse of a unit time after this article is located at the initial position P1) is calculated. Further, an arrival position P3 after another unit time is found by the sum of a vector V4 of the travel speed of the article 90 at the arrival position P2 and the vector V3. Then, similarly, the conveying path, interconnecting passage points of the article 90, is found. Therefore, in the CPU 61, the conveying path is beforehand determined by the initial position and final position of the article 90, and a vector of the travel speed of the article 90 at each of passage target points, obtained by dividing this conveying path, is computed. The servomotors 46 and 47 for the feed portions 15 are driven on the basis of these vectors. Therefore, the article 90 can move along the conveying path.

Figure 11A:
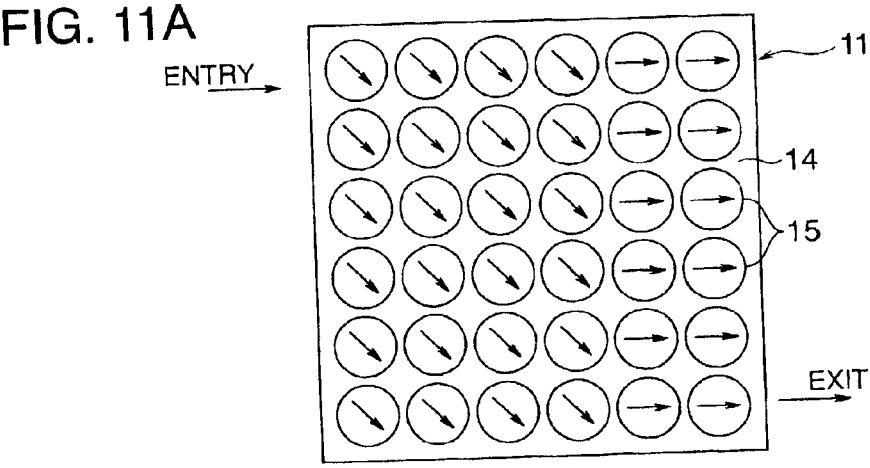
FIG. 11A is a plan view of the conveying module, showing directions of conveying of an article.

For example, an EEPROM 63 (corresponding to "data storage means" of the present invention), storing layout data relating to conveying paths of the article 90, is provided in the controller 50. The layout data includes entry position data, representing a position where the article 90 enters the conveying surface 14, and exit position data representing a position where the article 90 exits the conveying surface 14, and a conveying path is formed by interconnecting the entry position and exit position of the article 90 by a line of a predetermined form. FIG. 11A shows one specific example of conveying path layouts, and in this case, an upper left portion of the conveying surface 14 is the entry position of the article 90, and a lower right portion thereof is the exit position, and these entry and exit positions are stored respectively as the entry position data and exit position data of the layout data.

Figure 11B:
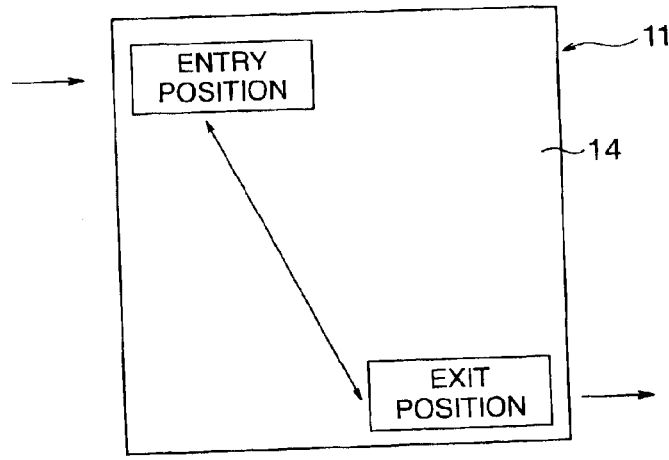
FIG. 11B is a plan view of the conveying module, showing one example of conveying paths.
Figure 11C:
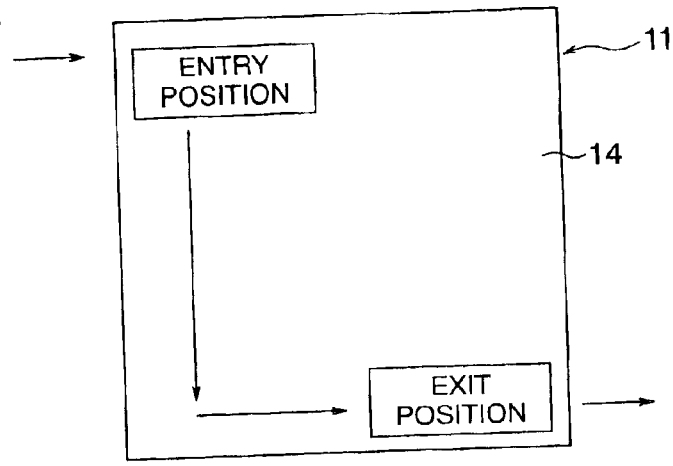
FIG. 11C is a plan view of the conveying module, showing a modified conveying path.

FIG. 11B shows one example of conveying paths interconnecting the entry position and the exit position, and in this case the conveying path extends obliquely from the entry position at an intermediate position in a main conveying direction (left-right direction in FIG. 11B), and then extends in the same direction as the main conveying direction. FIG. 11C shows another example of conveying paths, and in this case the conveying path of the article 90 first extends in a direction perpendicular to the main conveying direction, and then extends in the same direction as the main conveying direction. Here, the conveying path does not always need to be the one along which the article 90 is moved continuously toward one side, and for example the conveying path can be the one along which the article 90, while repeatedly moved back and forth on the conveying surface 14, is conveyed to a predetermined position as when a car is put into a garage.

The controller 50 includes a console 65 (corresponding to "data change means" of the present invention) for inputting the layout data. By operating this console 65, the layout data, stored in the above data memory, can be renewed.

The CPU 61 of the controller 50 executes, for example, an article recognition program (corresponding to "article recognition means" of the present invention), stored in the ROM 62, at predetermined periods, and by doing so, the position, size and posture of the article 90 can be recognized in accordance with detection results of the article detection sensors 49. More specifically, among the plurality of article detection sensors 49, a group of article detection sensors 49 over which the article 90 is disposed are activated, and the shape of the article 90 can be recognized by these activated article detection sensors 49. At this time, the group of activated article detection sensors 49 shift in accordance with the movement of the article 90. Therefore, the position, size and posture of the article 90 can be detected on the basis of the time of movement of the article 90, the position and activation time of the activated article detection sensor group.

Figure 12:
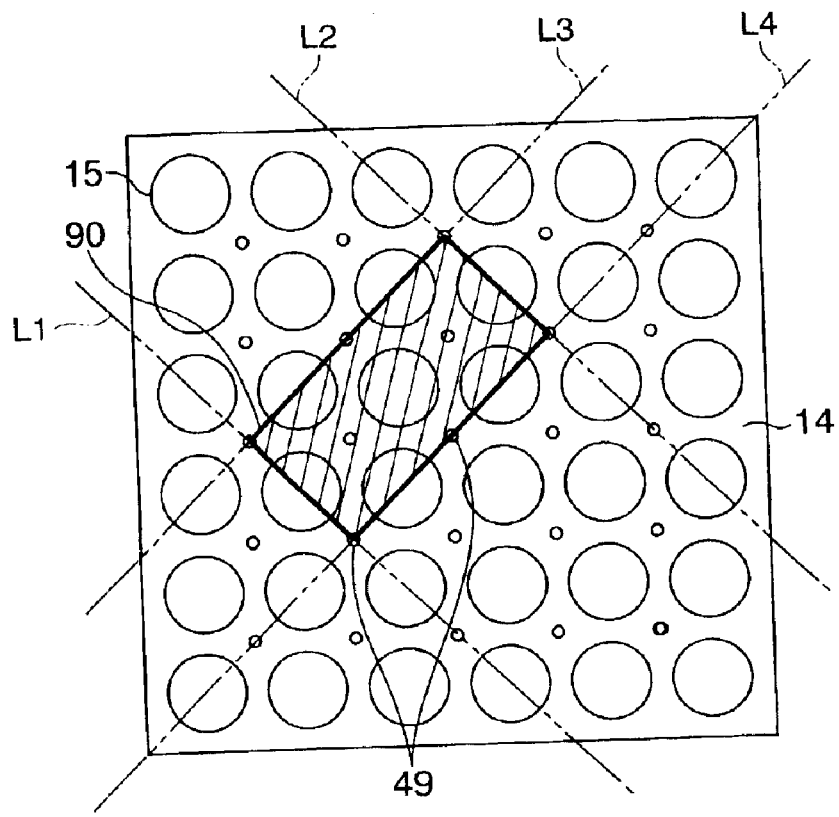
FIG. 12 is a conceptual view showing a method of finding a contour of the article.

When the article 90 is one of a simple shape such as a corrugated cardboard box, a contour line of the article 90 can be detected by activation of at least two article detection sensors 49 located respectively at different positions, as shown in FIG. 12. And, a region, surrounded by four contour lines L1 to L4, can be detected as the shape of the article 90. Incidentally, the centroid is found from the thus obtained plane figure of the article 90, and this centroid can be used as a representative point of the article 90.

Figure 13:
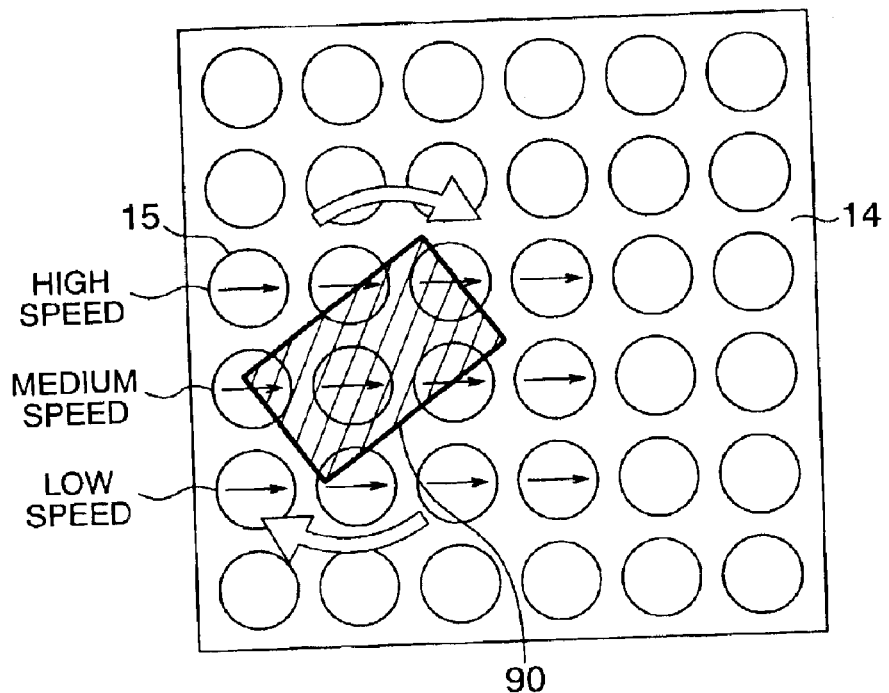
FIG. 13 is a conceptual view showing a method of changing the posture of the article.

Recognition results of the article recognition program are inputted into the main program, and a deviation between the set entry position (obtained by the layout data) and the actual entry position is calculated by this main program. If such a deviation is found, the conveying path of the article 90 and the conveying posture thereof are corrected. Further, the main program functions to move the article 90 while changing the posture thereof, if necessary. For changing the posture of the article 90, the rotational speed of those feed rollers 17, contacting one of the opposite side edges of the lower surface of the article 90, is made different from the rotational speed of those feed rollers 17 (which are spaced from the first-mentioned feed rollers 17 in a direction perpendicular to the main conveying direction (left-right direction in FIG. 13)) contacting the other side edge of the lower surface of the article 90, as shown in FIG. 13, and by doing so, that side (upper side in FIG. 13) of the article, contacting the feed rollers 17 of higher rotational speed, can be turned clockwise (FIG. 13) so that the article 90 can be directed in the main conveying direction.

Figure 1B:
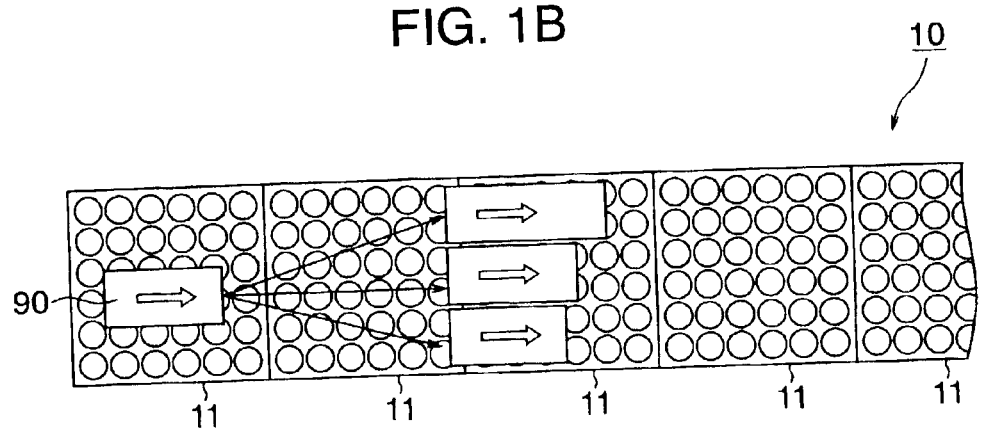
FIG. 1B is a plan view of a portion of the conveying system having modified conveying paths.

There can be provided a program (corresponding to "conveying designation-determining means" of the present invention) which determines different conveying destinations for different kinds of articles 90 on the basis of the recognition results of the article recognition program. More specifically, when the articles 90 can be judged such that the articles 90 can be classified into a large size, a medium size and a small size as shown in FIG. 1B, these articles can be conveyed to a left end portion, a central portion and a right end portion with respect to the main conveying direction according to the size of the articles.

As shown in FIG. 9, the controller 50 includes an I/O port 66 (corresponding to "signal transmitting/receiving means" of the present invention) for transmitting and receiving information relative to the controllers 50 of other conveying modules 11. A plurality of controllers 50 for conveying modules 11 can be connected together so that communication can be effected between their controllers 50, as shown in FIG. 1A. With this construction, for example, when the article 90 moves forward or backward from one conveying module 11 to another conveying module 11, information such as the delivery timing, posture, direction and size of the article 90, is fed, for example, from the controller 50 of the upstream conveying module 11 to the controller 50 of the downstream conveying module 11. As a result, the delivery of the article 90 can be effected smoothly.

The foregoing is the description of the construction of the single conveying module 11. The conveying system 10 comprises a plurality of conveying modules 11 combined into a predetermined form and the controllers 50 of these conveying modules 11 connected together. FIGS. 1 and 14 to 16 show examples of conveying systems 10 in which the conveying modules 11 are freely arranged lengthwise and/or breadthwise into desired forms, so that these conveying systems 10 have different width, length and configuration. Here, each of the conveying modules 11 has a square shape, and the length and breadth thereof are equal to each other. Therefore, when the conveying modules 11 are arranged either lengthwise or breadthwise, the corresponding sides of the conveying modules 11 are disposed flush with each other, and the installation can be carried out easily.

The controllers 50 of all of the conveying modules 11, forming the conveying system 10, can be connected to a main controller (not shown in a drawing), in which case this main controller collectively controls the operations of all of the conveying modules 11. In this case, the conveying system 10 corresponds to "the conveying system" of the present invention, and also corresponds to "the conveying apparatus" of the present invention. When the conveying system 10 is construed as forming "the conveying apparatus" of the present invention, the main controller corresponds to "the controller" of the present invention. Furthermore, the controllers 50 of the conveying modules 11 are not connected together, and each conveying module can be controlled by the individual conveying system 10.

Next, the operation and function of this embodiment of the above construction are described.

Figure 14:
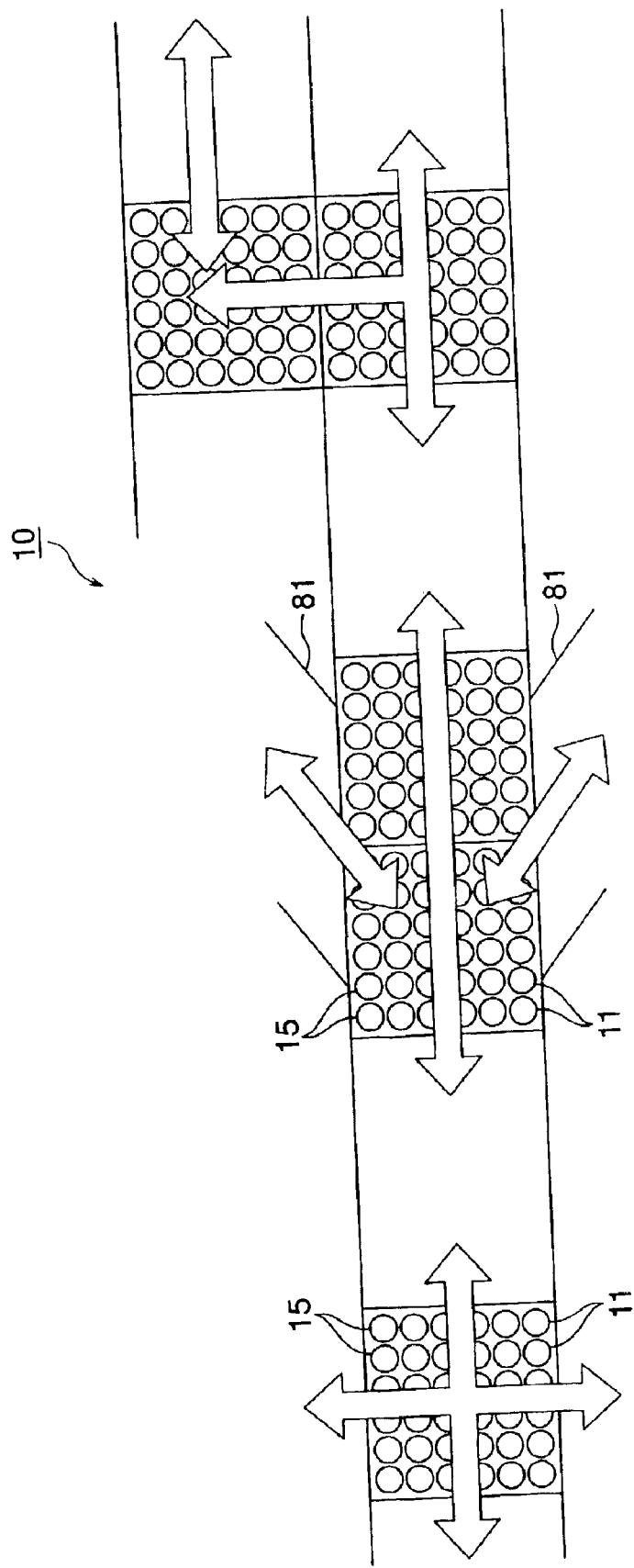
FIG. 14 is a plan view showing one example of conveying systems.

In this embodiment, the conveying module 11 can freely convey the article 90 in all directions, that is to say, the conveying direction is not limited to the front, back, left and right directions. Therefore, a desired number of conveying paths can be set on the conveying system 10 without providing any physical obstacle. More specifically, in the conveying system 10 in which the conveying modules 11 are arranged linearly as shown in FIG. 14, the articles 90 can be collected at lateral collecting places at a desired position in the longitudinal direction of the conveying system 10 as indicated by arrows in FIG. 14. Also, the articles 90 can be discharged toward hoppers 81 branching off from the conveying system 10 in directions inclined relative to the longitudinal direction thereof. Furthermore, as shown in FIG. 1A, the direction of the article 90 can be changed by turning (angularly moving) it, and the distance between the two articles 90, arranged in the conveying direction, can be changed by making the rotational speed of the feed rollers 17, contacting one of the two articles 90, different from the rotational speed of the feed rollers 17 contacting the other article 90. By doing so, the distance between the adjacent articles 90 can be reduced to a minimum, so that the conveying operation can be carried out efficiently.

Figure 15:
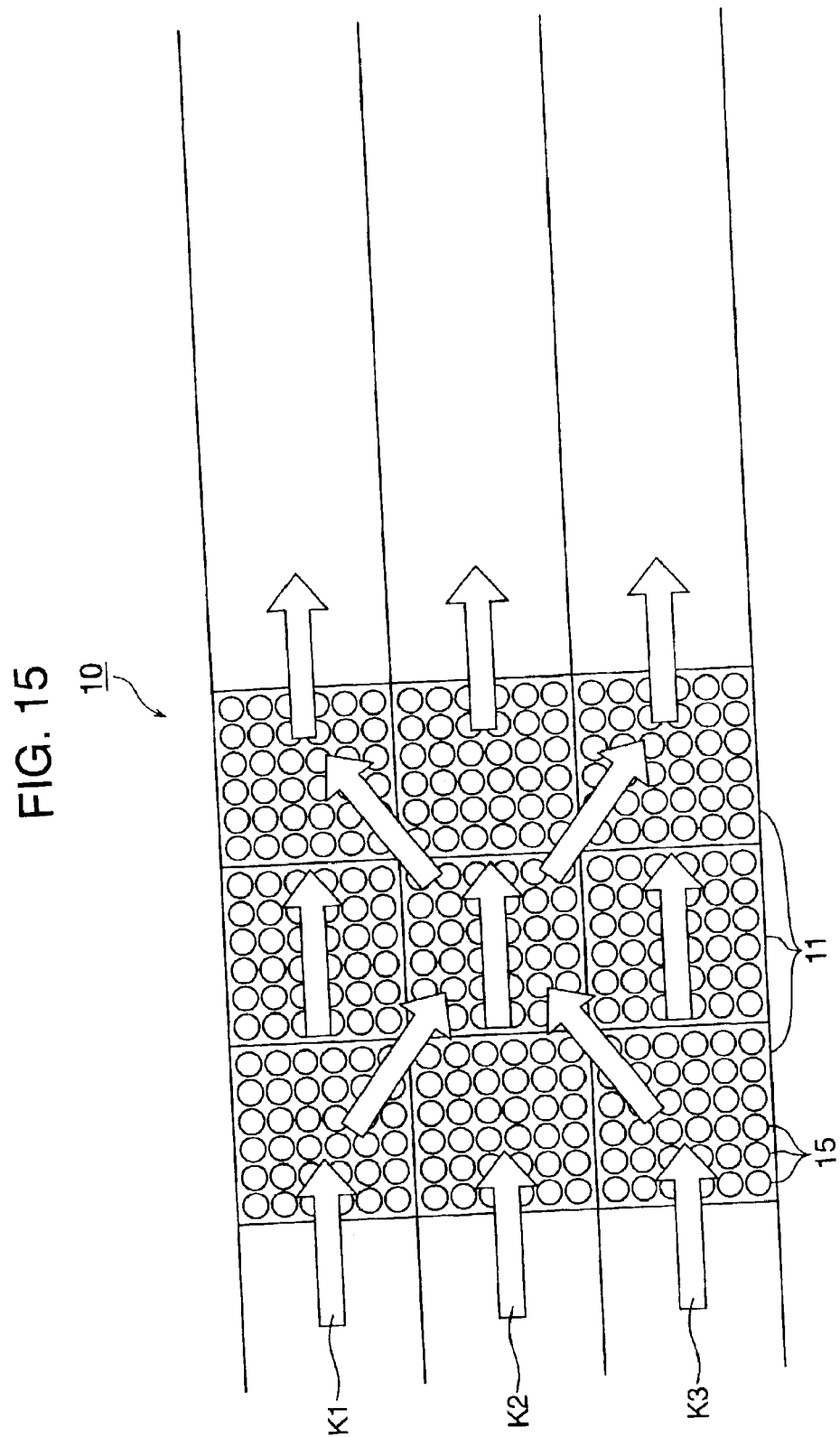
FIG. 15 is a plan view showing another example of the conveying systems.

As shown in FIG. 15, a plurality of articles 90 can be simultaneously moved respectively along conveying paths K1, K2 and K3 in parallel relation to one another, and these conveying paths K1, K2 and K3 can be joined midway, and then this joined path can be divided.

Figure 16:
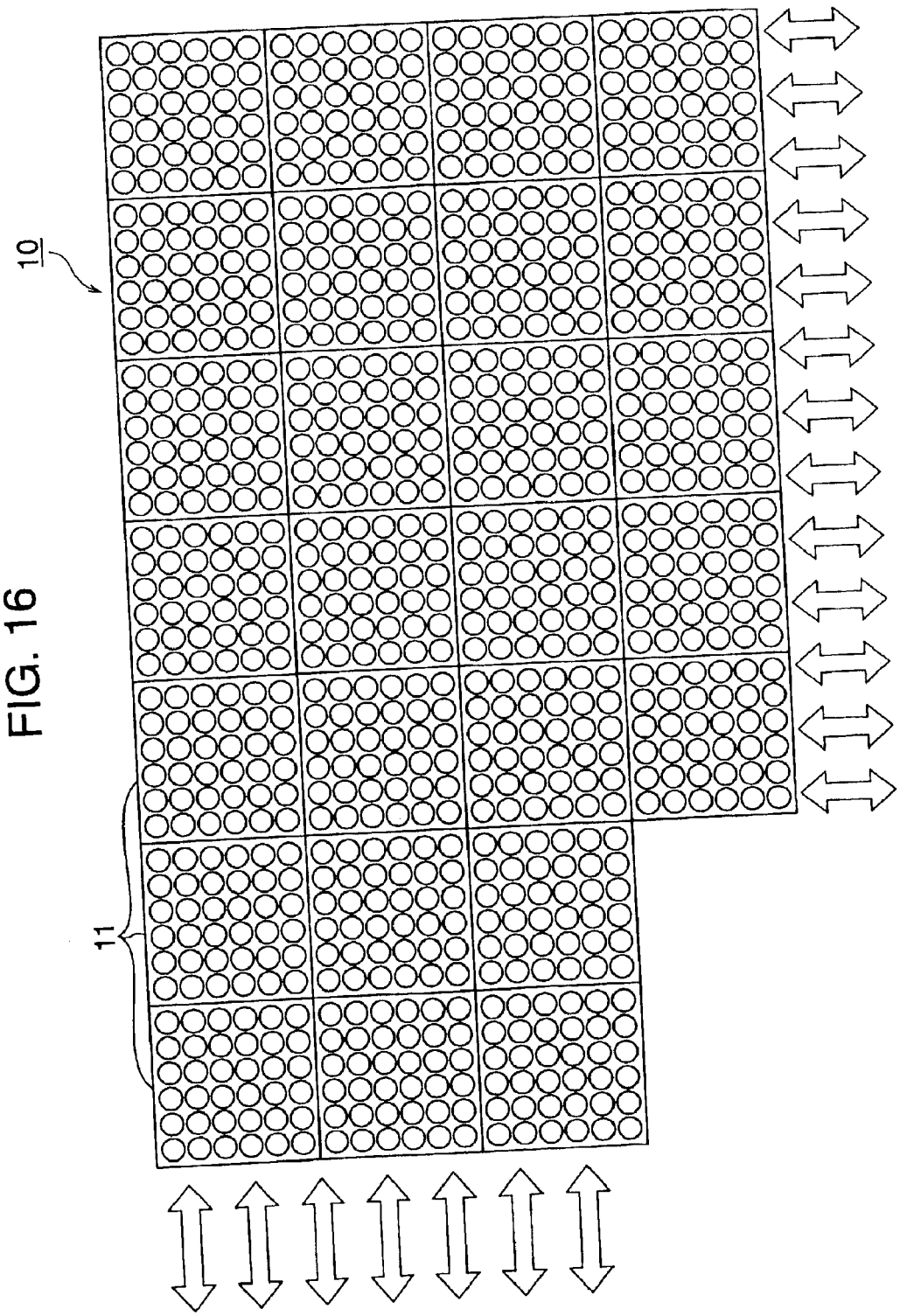
FIG. 16 is a plan view showing a further example of the conveying systems.

For example, at a flat site, the conveying modules can be arranged into a conveying form suited for conveying articles by a fork lift truck. Namely, as shown in FIG. 16, the conveying modules 11 are arranged to form a conveying area of a size sufficiently large for the articles 90, and a plurality of branching conveying paths are set on this conveying area, and by doing so, a plurality of kinds of articles can be collected at predetermined positions in the conveying area. And besides, the conveying system is so constructed that the articles 90 can enter and exit the conveying area at a plurality of positions as shown in FIG. 16, and by doing so, the efficiency of conveying of the articles into and out of the conveying area can be enhanced. In all of the above cases, merely by changing the layout data stored in the controllers 50, the layout of the conveying paths can be easily effected.

As described above, in the conveying system 10 and the conveying module 11 of this embodiment, by driving the twist base 16 and the feed rollers 17 respectively by the servomotors 46 and 47, the article 90 can be moved to a desired position, and the degree of freedom for determining the conveying path increases. And besides, by operating the console 65, the layout data of the conveying path can be changed, and the layout of the conveying path can be easily changed without the need for moving the facilities. Furthermore, the article 90 is moved while its posture is changed if necessary, and therefore the conveying efficiency is enhanced as compared with the case where the posture change and the movement are effected separately.

In the feed portion 15 of the conveying module 11 of this embodiment, the twist gear 34 of the twist base 16 is disposed below the feed rollers 17, and therefore the degree of freedom of the configurations of the twist gear 34 and feed rollers 17 is higher as compared with the conventional construction in which the feed roller is provided within the twist gear. Therefore, a compact design of the twist gear 34 can be achieved, and the adjacent feed portions 15 can be disposed closer to each other as compared with the conventional construction, and besides a large-size design of the feed rollers 17 can be achieved, so that the area of contact of each feed roller 17 with the article can be increased. With this construction, the force can be efficiently transmitted from each feed portion 15 to the article 90 so as to smoothly convey the article 90 in an arbitrary direction.

The idle shaft 38 is connected to the feed rollers 17 and the vertical shaft 36 by the gears, and the bevel gear 37A is mounted on the idle shaft 38. Therefore, a bevel gear does not need to be mounted on the rotation shaft of each feed roller 17, and the degree of freedom of the configuration of the feed rollers 17 and 17 increases. With this construction, the pair of feed rollers 17 and 17 can be provided, and this also increases the area of contact of the feed rollers 17 with the article. And besides, the plurality of (two in this embodiment) feed rollers 17 are provided for each feed portion 15, and this also increases the area of contact between the feed rollers 17 and the article 90.

[Second Embodiment]

This embodiment is shown in FIGS. 17 to 21. Only those portions of this embodiment different in construction from the first embodiment will be described below, and those portions identical in construction to the first embodiment will be designated by identical reference numerals, respectively, and repeated description thereof will be omitted.

Figure 17:
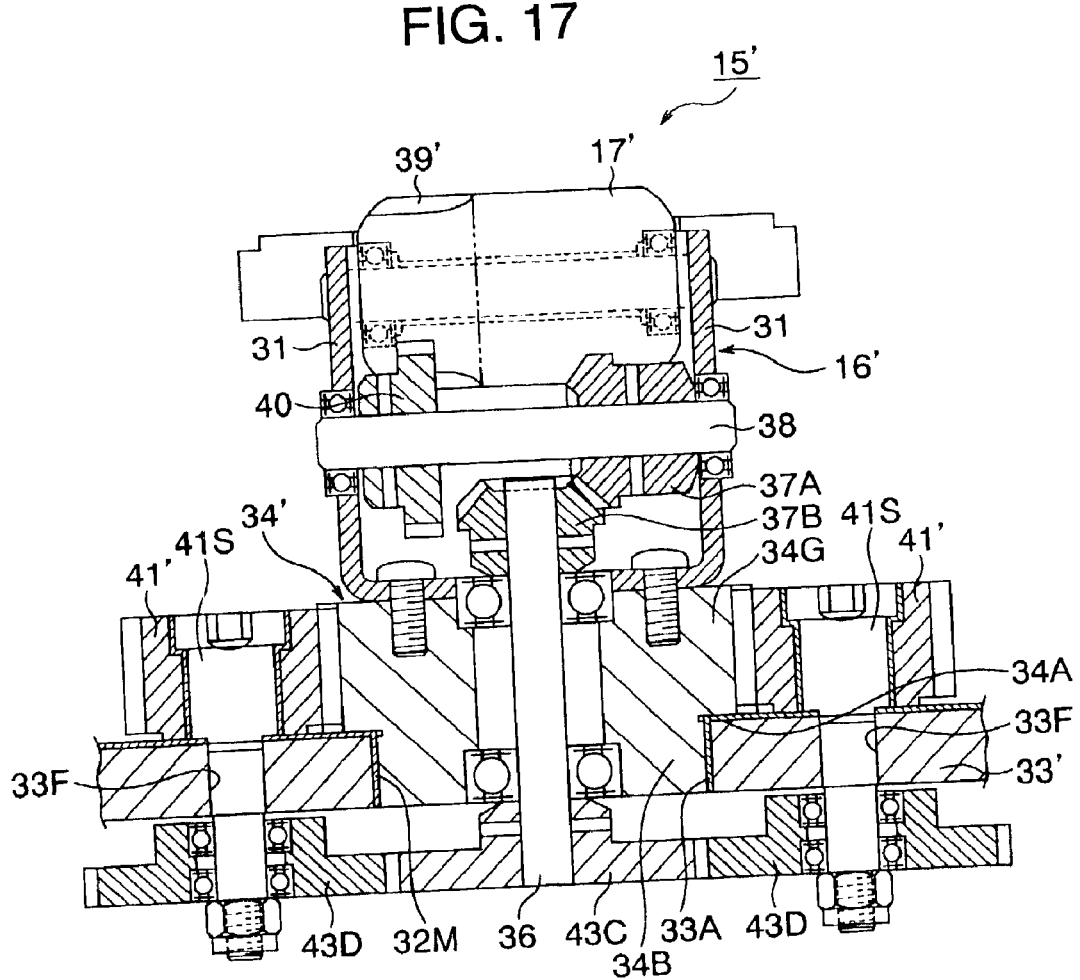
FIG. 17 is a cross-sectional view of a feed portion provided at a second embodiment of a conveying module of the invention.
Figure 18:
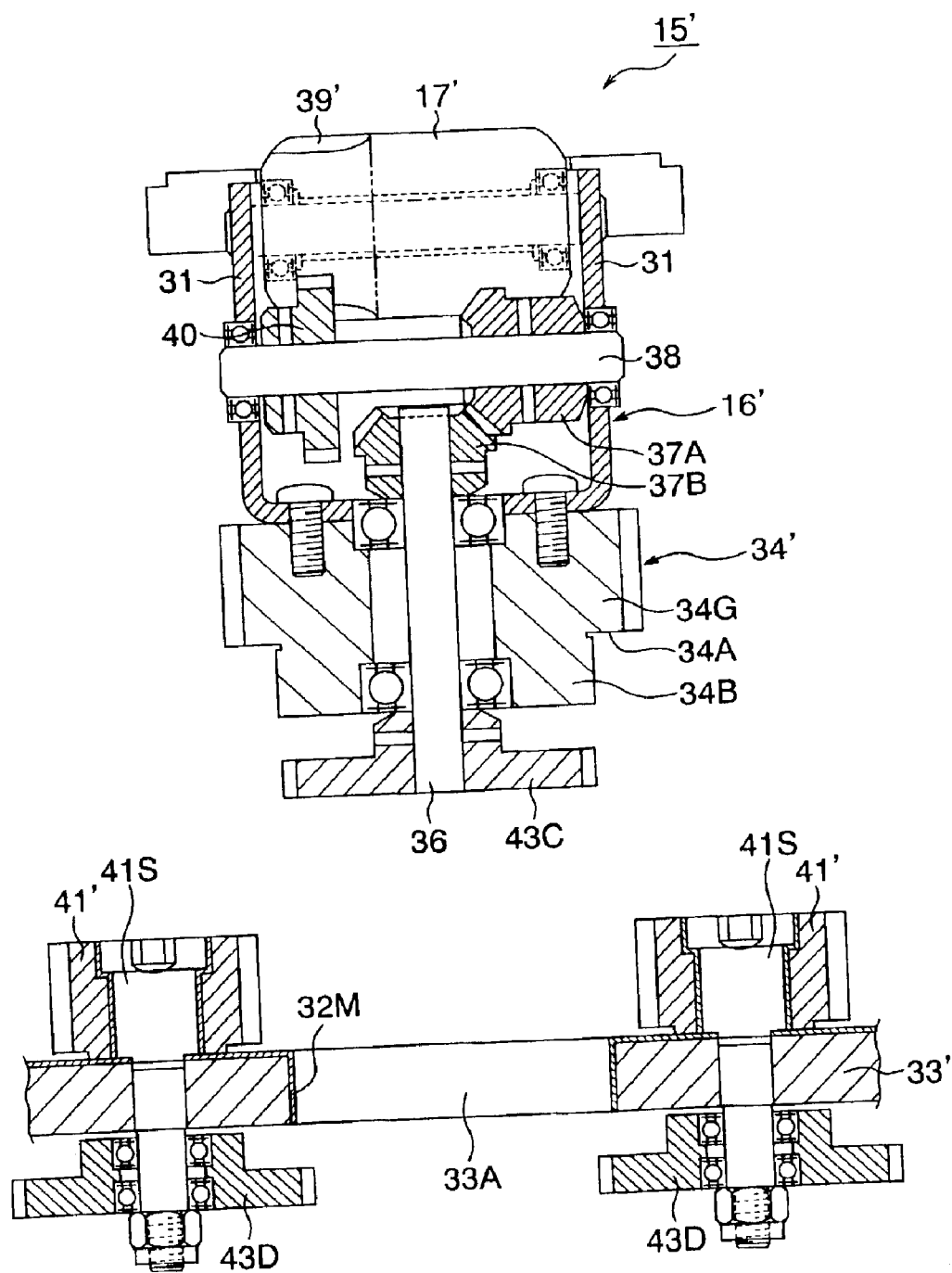
FIG. 18 is a cross-sectional view showing a condition in which the feed portion is removed from a lower wall of a fixed base.
Figure 19:
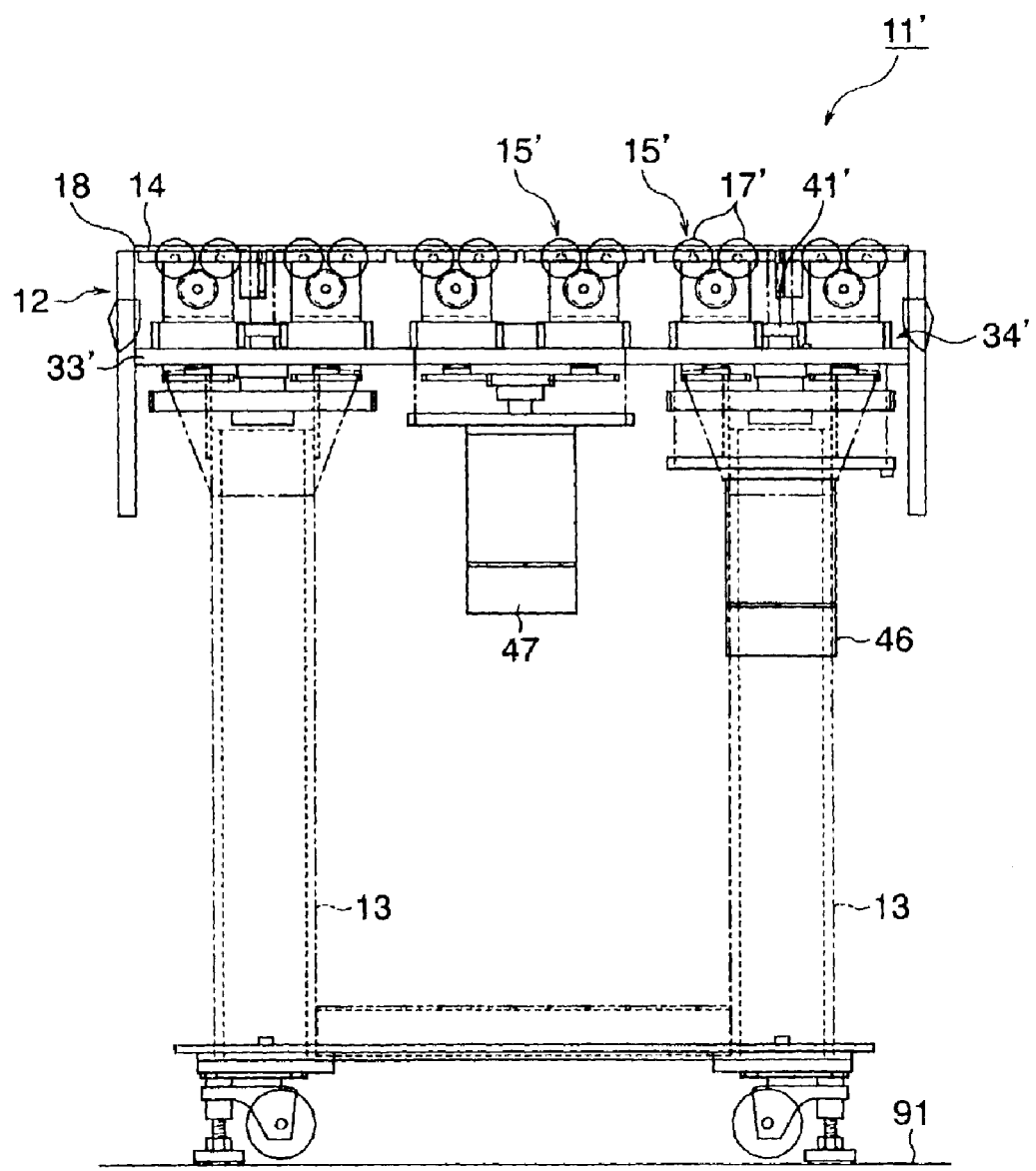
FIG. 19 is a side-elevational view of the conveying module.

As shown in FIG. 17, a lower wall 33' of a fixed base 12, provided at a conveying module 11' ("conveying apparatus" of the present invention), is in the form of a flat plate, and has a plurality of idle gear-mounting holes 33F provided around each mounting hole 33A in which a feed portion 15' is mounted. An upper surface of the lower wall 33' and inner surfaces of the mounting holes 33A are covered with a sliding metal 32M. For example, the idle gear-mounting hole 33F is disposed between any two mounting holes 33A and 33A adjacent to each other in a lengthwise direction, and also the idle gear-mounting hole 33F is disposed between any two mounting holes 33A and 33A adjacent to each other in a breadthwise direction. A gear support shaft 41S is inserted into the idle gear-mounting hole 33F from the upper side, and is mounted therein, and an idle gear 41' is rotatably mounted on an upper end portion of the gear support shaft 41S, while an idle gear 43D is rotatably mounted on a lower end portion of the gear support shaft 41S.

A twist base 16', provided at the feed portion 15' of this embodiment, has a U-shape, and an end surface of a twist gear 34' is held against and fixedly secured to a bottom wall of the twist base 16'. The twist gear 34' has such a construction that a twist shaft body 34B projects downwardly from a lower end surface of a spur gear portion 34G. The twist shaft body 34B is rotatably fitted in the mounting hole 33A. The lower end surface 34A of the spur gear portion 34G is slidably held against an upper peripheral edge portion of the mounting hole 33A by the weight of the feed portion 15'. With this construction, the feed portion 15' is held in position on the lower wall 33'.

A spur gear 43C, which is smaller in outer diameter than the twist shaft body 34B, is fixedly secured to a lower end portion of a vertical shaft 36 extending vertically through the twist gear 34'. As appreciated from the comparison between FIGS. 17 and 18, the feed portion 15' can be releasably mounted in the mounting hole 33A in the lower wall 33' from the upper side without effecting a screw-fastening operation or the like.

In the conveying module 11' of this embodiment, merely by inserting the feed portion 15' into the mounting hole 33A, the spur gear portion 34G of the twist gear 34' is brought into meshing engagement with the idle gears 41' on the upper side of the lower wall 33', and is connected to a twist-purpose servomotor 46 (see FIG. 19), and at the same time the spur gear 43C is brought into meshing engagement with the idle gears 43D on the lower side of the lower wall 33', so that the vertical shaft 36 is kept connected by the gears to a feed-purpose servomotor 47 (see FIG. 19) by the weight of the feed portion 15'. With this construction, the feed portion 15' can be releasably mounted on the fixed base 12 in easy manner, and the efficiency of a maintenance operation for the feed portion 15', as well as the efficiency of an operation for changing the layout of the feed portions 15', can be enhanced.

The gear connecting mechanism for connecting the twist gear 34' to the twist-purpose servomotor 46 and the gear connecting mechanism for connecting the lower end portion of the vertical shaft 36 to the feed-purpose servomotor 47 are disposed separately on the upper and lower sides of the lower wall 33' of the fixed base 12, respectively, and therefore each of the gear-connecting mechanisms is simplified in construction.

And besides, in the fixed base, the plurality of idle gear-mounting holes 33F are provided around each of the feed portions 15', so that the degree of freedom of arrangement of the idle gears 41' and 43D increases, and therefore the degree of freedom of combination of the feed portions 15' to be interlocked to each other increases.

Figure 20:
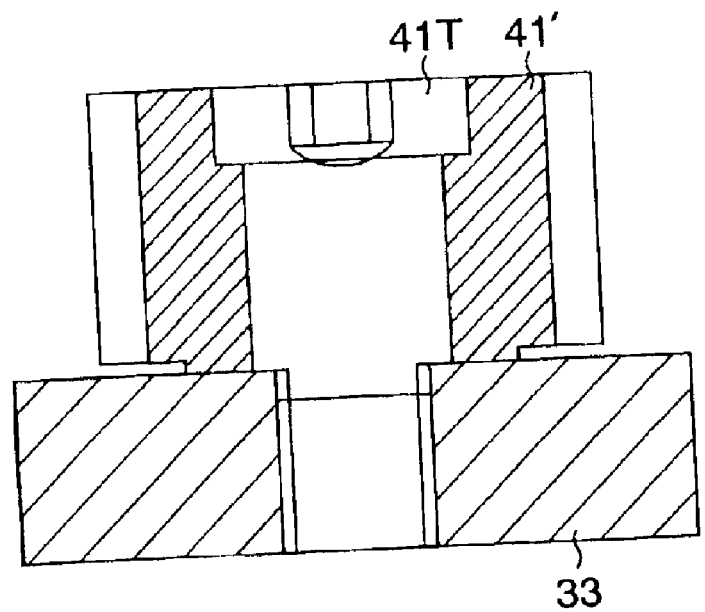
FIG. 20 is a cross-sectional view showing the structure of a support portion for an idle gear.
Figure 21:
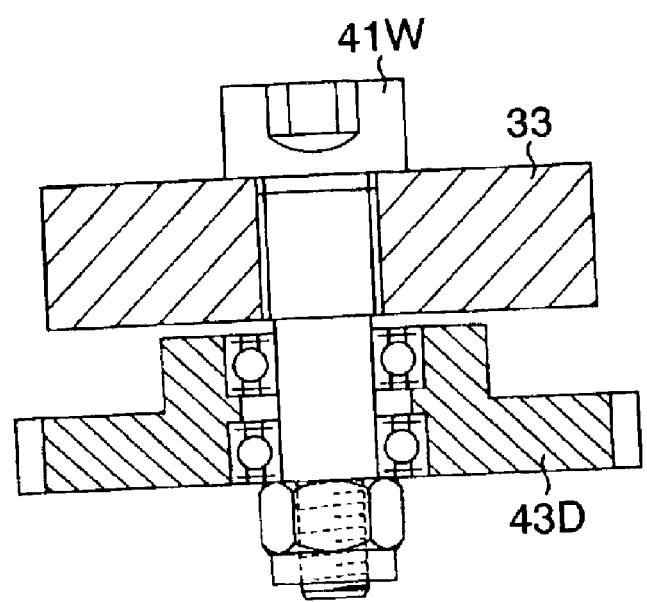
FIG. 21 is a cross-sectional view showing the structure of a support portion for an idle gear.
Figure 22:
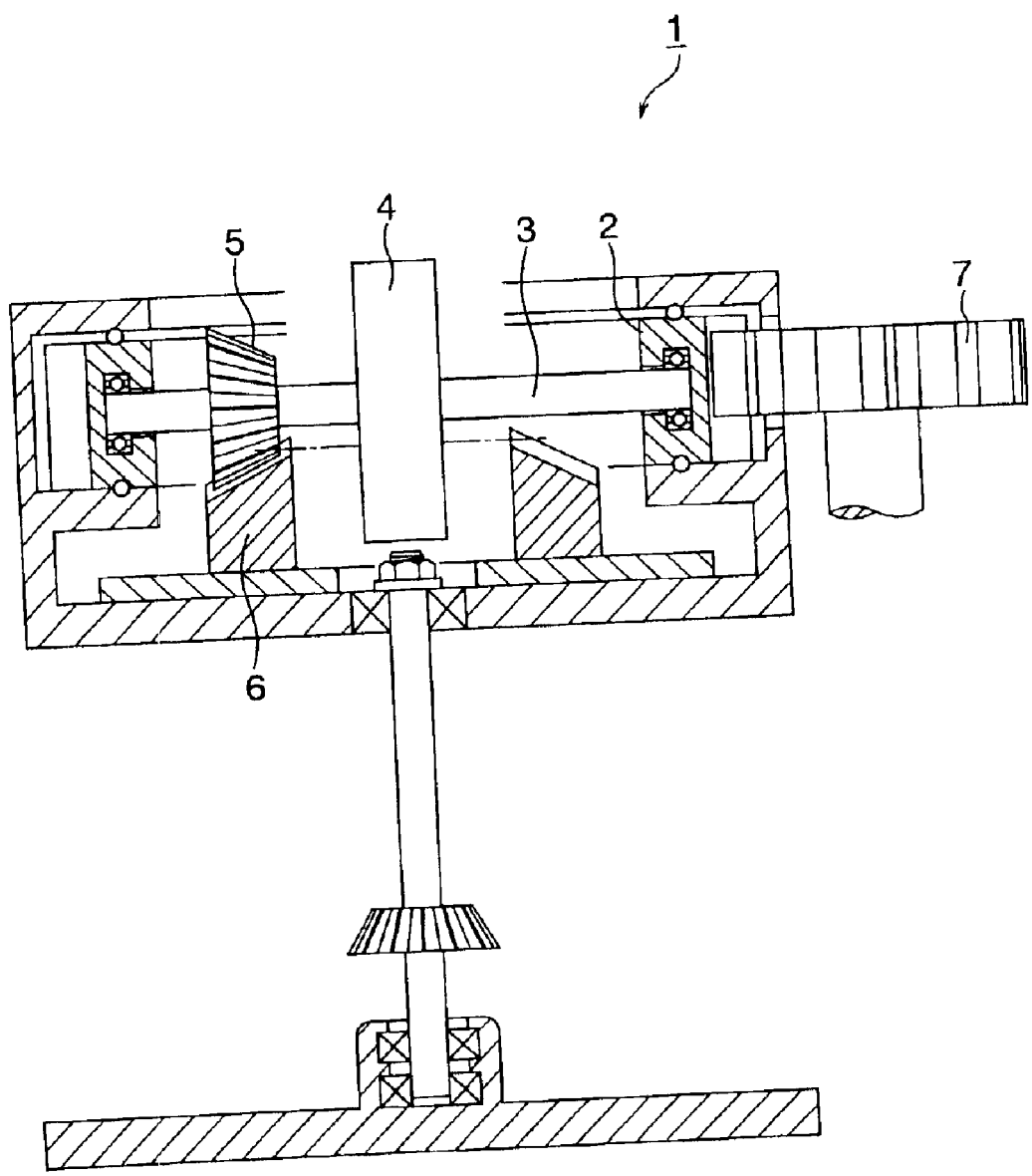
FIG. 22 is a cross-sectional view of a conventional conveying apparatus.

A gear support shaft 41T for supporting only the idle gear 41' for the twist gear 34' can be mounted in the idle gear-mounting hole 33F as shown in FIG. 20, and a gear support shaft 41W for supporting only the idle gear 43D for the vertical shaft 36 can be mounted in the idle gear-mounting hole 33F as shown in FIG. 21. Namely, the idle gear 41' for the twist gear 34' of each feed portion 15' and the idle gear 43D for the vertical shaft 36 may be disposed separately.

[Other Embodiments]

The present invention is not limited to the above constructions, and for example the following constructions falls within the scope of the present invention, and further various modifications other than the following can be made without departing from the scope of the invention.

(1) In the first embodiment, although the conveying surface 14 of the conveying module 11 has the square shape, it can have any other suitable shape such as a rectangular shape and a triangular shape.

(2) In the first and second embodiments, although the plurality of feed portions 15 are so arranged in a distributed manner that the number of columns of feed portions 15 is equal to the number of rows of feed portions 15, the number of columns and the number of rows can be different from each other.

(3) In the first and second embodiments, although each of the feed rollers 17 and 17' has a cylindrical shape, "the feed roller" of the present invention can have, for example, a spherical shape or an ellipsoidal shape. It is not always necessary to provide two feed rollers for each of the feed portions 15 and 15' as in the above embodiment, and one or more than two feed rollers can be provided for each feed portion.

In the feed portion provided at the conveying apparatus of the invention 8, the twist gear of the twist base is disposed below the feed roller, and therefore the degree of freedom of the configurations of the twist gear and feed roller is higher as compared with the conventional construction in which the feed roller is provided within the twist gear. Therefore, the compact design of the twist gear can be achieved, and the adjacent feed portions can be disposed closer to each other as compared with the conventional construction, and besides the large-size design of the feed roller can be achieved, so that the area of contact of the feed roller with the article can be increased. With this construction, the force can be efficiently transmitted to the article so as to smoothly convey the article in an arbitrary direction.

In the conveying apparatus of the invention 9, the idle shaft is connected to the feed roller and the vertical shaft by the gears, and the bevel gear is mounted on the idle shaft. Therefore, a bevel gear does not need to be mounted on the feed roller, and the degree of freedom of the configuration of the feed roller increases. There can be provided a plurality of feed rollers connected to the idle shaft by gears, and by doing so, the area of contact of the feed rollers with the article can be increased.

In the conveying apparatus of the invention 10, the feed portions is formed into the unit, so that when this unit is inserted into the mounting hole from the upper side, the twist gear is connected to the twist-purpose servomotor by the gears, while the vertical shaft is kept connected by the gears to the feed-purpose servomotor by the weight of the feed portion. Therefore, the feed portion can be easily mounted on and removed from the fixed base, and the efficiency of the maintenance operation for the feed portion, as well as the efficiency of the operation for changing the layout of the feed portions of the conveying apparatus, can be enhanced.

In the conveying apparatus of the invention 11, the gear connecting mechanism for connecting the twist gear to the twist-purpose servomotor and the gear connecting mechanism for connecting the lower end portion of the vertical shaft to the feed-purpose servomotor are disposed separately on the upper and lower sides of the predetermined wall of the fixed base, respectively, and therefore each of the gear-connecting mechanisms is simplified in construction.

In the conveying apparatus of the invention 12, the twist gears of the adjacent feed portions are interconnected by the idle gear, and therefore the twist-purpose servomotor serves as a common drive source for a plurality of twist bases, and the cost can be reduced.

In the conveying apparatus of the inventions 13 and 15, the fixed base has the plurality of idle gear mounting portions provided around each of the feed portions, and therefore the degree of freedom of arrangement of the idle gears (each interconnecting the twist gears of the adjacent feed portions) and/or idle gears (each interconnecting the vertical shafts of the adjacent feed portions) increases.

In the conveying apparatus of the inventions 14 and 15, the plurality of feed rollers are interconnected, and therefore the feed-purpose servomotor serves as a common drive source for a plurality of feed rollers.

In the conveying apparatus of the invention 17, the plurality of feed rollers of a cylindrical shape are provided, and therefore the area of contact of the feed rollers with the article is larger as compared with the case where one feed roller is provided, and therefore a larger force can be applied from the feed rollers to the article.

In the conveying apparatus of the invention 18, the plurality of feed portions are divided into a plurality of groups which are driven independently of each other, and therefore a plurality of articles can be simultaneously conveyed from different positions on the conveying surface in different directions, so that the conveying efficiency is enhanced.

In the conveying apparatus of the invention 19, the plurality of feed portions are arranged in columns and rows in a distributed manner, and therefore the positions of the feed portions can be easily stored as data in each controller.

In the conveying apparatus of the invention 20, the conveying surface has a square shape, and the plurality of feed portions are so arranged in a distributed manner in that the number of columns of the feed portions is equal to the number of rows of the feed portions. Therefore, it is not necessary to distinguish between the length and breadth, and the degree of freedom of arrangement of the conveying apparatus increases.

In the conveying apparatus of the invention 21, the controller can compute the position of the article on the basis of information, relating to the initial position of the article entering the conveying surface, and the feed condition information relating to the direction and rotating amount of the feed roller, thereby controlling the position of the article.

In the conveying apparatus of the invention 22, the controller can determine the path of conveying of the article on the conveying surface on the basis of the information, relating to the initial position of the article, and information relating to the final position indicating a conveying destination of the article.

In the conveying apparatus of the invention 23, the layout data, stored in the data storage means, can be changed by operating the data change means, and by doing so, the layout can be changed without the need for the movement of the facilities as required in the conventional construction.

In the conveying apparatus of the invention 24, the layout data includes the article entry position data and the article exit position data, and therefore the conveying apparatus can accurately send the article to other conveying apparatus, disposed adjacent to the conveying surface thereof, or can accurately receive the article from the other conveying apparatus.

In the conveying apparatus of the invention 25, the article can enter and exit the conveying surface at a plurality of positions, and therefore the articles can be conveyed in a parallel, juxtaposed manner, so that the conveying efficiency is enhanced.

In the conveying apparatus of the invention 26, the articles can be assorted into different conveying designations in accordance with the kind of the articles, and can be collected at such different places.

In the construction of the invention 27, the position of the article can be computed by the use of a vector of the tangential velocity of the feed roller and the article relative to each other. In this case, the center of the area of contact between the feed roller and the article is disposed at the axis of rotation of the twist base (the invention 28), and by doing so, the starting point of the vector of the tangential velocity can be set on the axis of rotation of the twist base. Therefore, even when the direction of the vector is varied, the starting point of the vector does not change, so that the calculation of the vector can be easily effected.

In the conveying apparatus of the invention 29, when the movement (entry and exist) of the article is carried out between the conveying apparatus and other conveying apparatus, the information is transmitted between the controllers of these conveying apparatuses, and therefore the movement of the article between the two conveying apparatuses can be carried out smoothly.

In the conveying apparatus of the invention 30, the article can be conveyed in accordance with the position, size and posture of the article recognized by the article detection sensors. When the article detection sensors are embedded in the conveying surface (the invention 31), the overall construction of the conveying apparatus, having the article detection sensors, is made compact.

In the conveying apparatus of the invention 32, the article is moved while being changed in posture if necessary, and therefore the conveying efficiency is enhanced as compared with the case where the posture change and the movement are effected separately.

A plurality of conveying apparatuses described above can be interconnected so that the article can be moved between the conveying apparatuses (the invention 33). In this case, there can be provided a main controller connected to the controllers provided respectively at the plurality of conveying apparatuses, and the main controller controls the plurality of conveying apparatuses in a coordinated manner.

What is claimed is:

1. A conveying apparatus wherein a plurality of feed portions are arranged two-dimensionally in a distributed manner on a conveying surface for conveying articles, and the feed portions sequentially feed each article so as to move it to a predetermined position on the conveying surface; said apparatus comprising:

a fixed base holding said plurality of feed portions;

a twist base which is provided at each of said feed portions, and can be rotated about an axis perpendicular to said conveying surface;

a feed roller which is mounted at an upper portion of each of said twist bases, and can be rotated about an axis parallel to said conveying surface;

a twist-purpose servomotor for driving said twist bases;

a feed-purpose servomotor for driving said feed rollers;

a twist gear which is fixedly mounted on each of said twist bases, and is disposed below said feed roller, and is connected by gears to said twist-purpose servomotor; and a vertical shaft which extends through each of said twist gears at an axis thereof, an upper end of said vertical shaft being connected by gears to said feed roller while a lower end thereof is connected by gears to said feed-purpose servomotor.

2. A conveying apparatus according to claim 1, in which an idle shaft is mounted on said twist base, and is disposed below said feed roller in parallel relation thereto, and is connected to said feed roller by gears, and said idle shaft is connected to an upper end of said vertical shaft by bevel gears.

3. A conveying apparatus according to claim 1, in which the plurality of said feed portions are arranged linearly, and a common drive shaft is provided beneath said feed portions, and extends in a direction of juxtaposition of said feed portions, and a vertical shaft extends through said twist base of each feed portion at the axis of rotation thereof, and a lower end of each of said vertical shafts is connected to said common drive shaft by bevel gears, while an upper end of each of said vertical shafts is connected to a rotation shaft of said feed roller by bevel gears, so that said feed-purpose servomotor serves as a common drive source for said plurality of feed rollers.

4. A conveying apparatus according to claim 1, in which a plurality of said feed rollers of a cylindrical shape are provided at the upper portion of each of said twist bases in parallel relation to each other, and said plurality of feed rollers are interconnected by an idle roller.

5. A conveying apparatus according to claim 1, in which said plurality of feed portions are divided into a plurality of groups which are driven independently of each other.

6. A conveying apparatus according to claim 1, in which upwardly-open mounting holes are formed in said fixed base, and each of said feed portions is formed into a unit which can be removably mounted in said mounting hole, and when said unit is inserted into said mounting hole from an upper side, said twist gear is connected to said twist-purpose servomotor by the gears, while said vertical shaft is kept connected by the gears to said feed-purpose servomotor by a weight of said feed portion.

7. A conveying apparatus according to claim 6, in which each of said twist gears is disposed at an upper side of a predetermined wall provided at said fixed base, while the lower end portion of each of said vertical shafts is disposed at a lower side of said wall.

8. A conveying apparatus according to claim 1, in which said twist gears of the adjacent feed portions are interconnected by an idle gear, and said twist-purpose servomotor serves as a common drive source for a predetermined number of said feed portions.

9. A conveying apparatus according to claim 8, in which said fixed base has a plurality of mounting portions provided around each of said feed portions, and said idle gears, each interconnecting the adjacent twist gears, are mounted at said mounting portions, respectively.

10. A conveying apparatus according to claim 1, in which the lower ends of said vertical shafts of the adjacent feed portions are interconnected by an idle gear, and said feed-purpose servomotor serves as a common drive source for a predetermined number of said feed portions.

11. A conveying apparatus according to claim 10, in which said fixed base has a plurality of mounting portions provided around each of said feed portions, and said idle gears, each interconnecting the lower ends of the adjacent vertical shafts, are mounted at said mounting portions, respectively.

12. A conveying apparatus according to claim 1, in which said plurality of feed portions are arranged in columns and rows in a distributed manner.

13. A conveying apparatus according to claim 12, in which said conveying surface has a square shape, and said plurality of feed portions are so arranged in a distributed manner that the number of columns of said feed portions is equal to the number of rows of said feed portions.

14. A conveying system wherein a plurality of conveying apparatuses as defined in claim 1 are interconnected so that said article can be moved between said conveying apparatuses.

15. A conveying system according to claim 14, in which there is provided a main controller connected to said controllers provided respectively at said plurality of conveying apparatuses, and said main controller controls said plurality of conveying apparatuses in a coordinated manner.

16. A conveying apparatus according to claim 1, in which there is provided a controller for said twist-purpose servomotor and said feed-purpose servomotor, and said controller computes the position of said article on the basis of information, relating to an initial position of said article entering said conveying surface, and feed condition information relating to the direction and rotating amount of said feed roller.

17. A conveying apparatus according to claim 16, in which said controller includes article recognition means for recognizing the kind of the article, and conveying designation-determining means for determining different conveying destinations for different kinds of articles on the basis of recognition results of said article recognition means.

18. A conveying apparatus according to claim 16, in which said article detection sensors are embedded in said conveying surface.

19. A conveying apparatus according to claim 16, in which said controller causes said article to move while changing the posture thereof if necessary.

20. A conveying apparatus according to claim 16, in which said controller includes signal transmitting/receiving means for transmitting and receiving information relative to the controllers of other conveying apparatuses.

21. A conveying apparatus according to claim 16, in which there are provided a plurality of article detection sensors each of which has a detection region, disposed in a direction perpendicular to said conveying surface, and detects the passage of said article, and said controller recognizes the position and/or size and/or posture of said article on the basis of detection results of said article detection sensors.

22. A conveying apparatus according to claim 16, in which said controller determines a conveying path of said article on said conveying surface on the basis of the information, relating to the initial position of said article, and information relating to a final position indicating a conveying destination of said article.

23. A conveying apparatus according to claim 22, in which said article can enter and exit said conveying surface at a plurality of positions, and said controller determines a conveying path in accordance with the entry and exit position of said article.

24. A conveying apparatus according to claim 16, in which said controller includes data storage means for storing layout data representative of conveying paths of said article on said conveying surface, and data change means for changing said layout data stored in said data storage means.

25. A conveying apparatus according to claim 24, in which said layout data includes entry position data, representing a position where said article enters said conveying surface, and exit position data representing a position where said article exits said conveying surface.

26. A conveying apparatus according to claim 16, in which said controller computes the position of said article by the use of a vector of a tangential velocity of said feed roller and said article relative to each other.

27. A conveying apparatus according to claim 26, in which a center of an area of contact between said feed roller and said article is disposed at the axis of rotation of said twist base.

* * * * *